US009023752B2

(12) United States Patent
Kim et al.

(10) Patent No.: US 9,023,752 B2
(45) Date of Patent: May 5, 2015

(54) METHOD OF PREPARING CATALYST USING ALKALI METAL OR ALKALINE EARTH METAL IN NATURAL CELLULOSE FIBERS AS CO-CATALYST AND DISPERSANT

(75) Inventors: Hee-Yeon Kim, Daejeon (KR); Nam-Jo Jeong, Daejeon (KR); Seong-Ok Han, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 295 days.

(21) Appl. No.: 13/339,706

(22) Filed: Dec. 29, 2011

(65) Prior Publication Data

US 2012/0277091 A1 Nov. 1, 2012

(30) Foreign Application Priority Data

Apr. 29, 2011 (KR) .................. 10-2011-0040645

(51) Int. Cl.
*B01J 37/08* (2006.01)
*B01J 37/34* (2006.01)
(Continued)

(52) U.S. Cl.
CPC .................. *B82Y 30/00* (2013.01); *B01J 37/08* (2013.01); *B01J 37/349* (2013.01); *B01J 21/18* (2013.01); *B01J 23/28* (2013.01); *B01J 23/42* (2013.01); *B01J 23/44* (2013.01); *B01J 23/462* (2013.01); *B01J 23/50* (2013.01); *B01J 23/52* (2013.01); *B01J 23/58* (2013.01); *B01J 23/75* (2013.01); *B01J 23/755* (2013.01); *B01J 23/78* (2013.01); *B01J 35/002* (2013.01); *B01J 35/006* (2013.01); *B01J 35/06* (2013.01); *B01J 35/1019* (2013.01); *B01J 35/1038* (2013.01); *B01J 35/1061* (2013.01); *B01J 37/0201* (2013.01);
(Continued)

(58) Field of Classification Search
CPC ........ B82Y 30/00; B01J 37/08; B01J 37/349; B01J 21/18; B01J 23/28; B01J 23/42; B01J 23/44; B01J 23/462; B01J 23/50
See application file for complete search history.

(56) References Cited

U.S. PATENT DOCUMENTS

| 3,461,082 A * | 8/1969 | Fukuoka et al. ............. 502/432 |
| 2009/0176646 A1 * | 7/2009 | Kim et al. .................... 502/172 |

(Continued)

FOREIGN PATENT DOCUMENTS

| EP | 2050494 A2 * | 4/2009 |
| JP | H09155187 A | 6/1997 |

(Continued)

OTHER PUBLICATIONS

R. D. Cortright et al., "Hydrogen from catalytic reforming of biomass-derived hydrocarbons in liquid water", Nature Publishing Group, Aug. 29, 2002, vol. 418, pp. 964-967.

(Continued)

*Primary Examiner* — Guinever Gregorio
(74) *Attorney, Agent, or Firm* — Westman, Champlin & Koehler, P.A.; Amanda M. Prose

(57) ABSTRACT

A method of preparing a catalyst using an alkali metal or an alkaline earth metal in natural cellulose fibers as a co-catalyst and a dispersant. The catalyst is prepared using an alkali metal or an alkaline earth metal as a co-catalyst and a dispersant, thus increasing the dispersibility of catalytic components and enhancing the interactions between the catalyst and the support to thereby retard agglomeration and increase the durability of the catalyst.

8 Claims, 18 Drawing Sheets

(51) Int. Cl.

| | | |
|---|---|---|
| *B01J 21/18* | (2006.01) | |
| *B01J 23/28* | (2006.01) | |
| *B01J 23/42* | (2006.01) | |
| *B01J 23/44* | (2006.01) | |
| *B01J 23/46* | (2006.01) | |
| *B01J 23/50* | (2006.01) | |
| *B01J 23/52* | (2006.01) | |
| *B01J 23/58* | (2006.01) | |
| *B01J 23/75* | (2006.01) | |
| *B01J 23/755* | (2006.01) | |
| *B82Y 30/00* | (2011.01) | |
| *B01J 23/78* | (2006.01) | |
| *B01J 35/00* | (2006.01) | |
| *B01J 35/06* | (2006.01) | |
| *B01J 35/10* | (2006.01) | |
| *B01J 37/02* | (2006.01) | |
| *H01M 4/90* | (2006.01) | |
| *H01M 4/92* | (2006.01) | |

(52) U.S. Cl.
CPC .......... *B01J37/0207* (2013.01); *H01M 4/9075* (2013.01); *H01M 4/925* (2013.01); *Y02E 60/50* (2013.01)

(56) References Cited

U.S. PATENT DOCUMENTS

2011/0111948 A1* 5/2011 Kim et al. .................. 502/5
2011/0294672 A1* 12/2011 Doppelt et al. ............ 505/447

FOREIGN PATENT DOCUMENTS

| JP | 2009072761 A | 4/2009 |
| JP | 2009160569 A | 7/2009 |
| JP | 2011101880 A | 5/2011 |
| KR | 1020110051306 A | 5/2011 |
| WO | WO-9712671 A1 | 4/1997 |
| WO | WO-2005007287 A1 | 1/2005 |

OTHER PUBLICATIONS

Vilas Ganpat Pol et al., "Carbon spherules: synthesis, properties and mechanistic elucidation", Science Direct, 2004, Carbon 42, pp. 111-116.

A. J. Vizcaino et al., "Ethanol steam reforming on Mg- and Ca-modified Cu—Ni/SBA—15 catalysts", Catalysis Today, 2009, Catalysis Today 146, pp. 63-70.

* cited by examiner

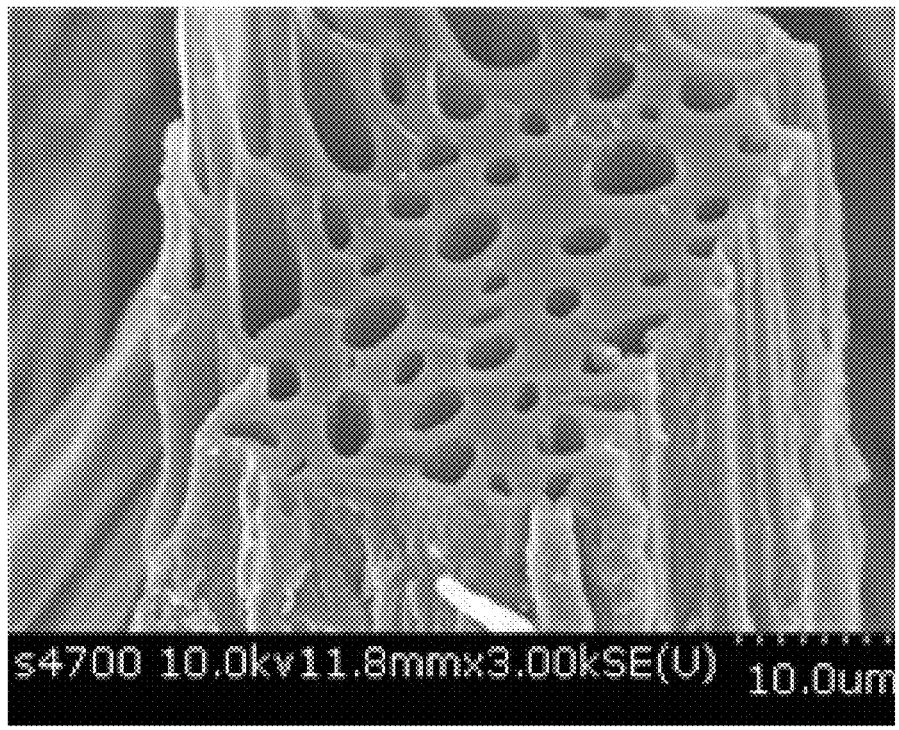
FIG. 1A
FIG. 1B
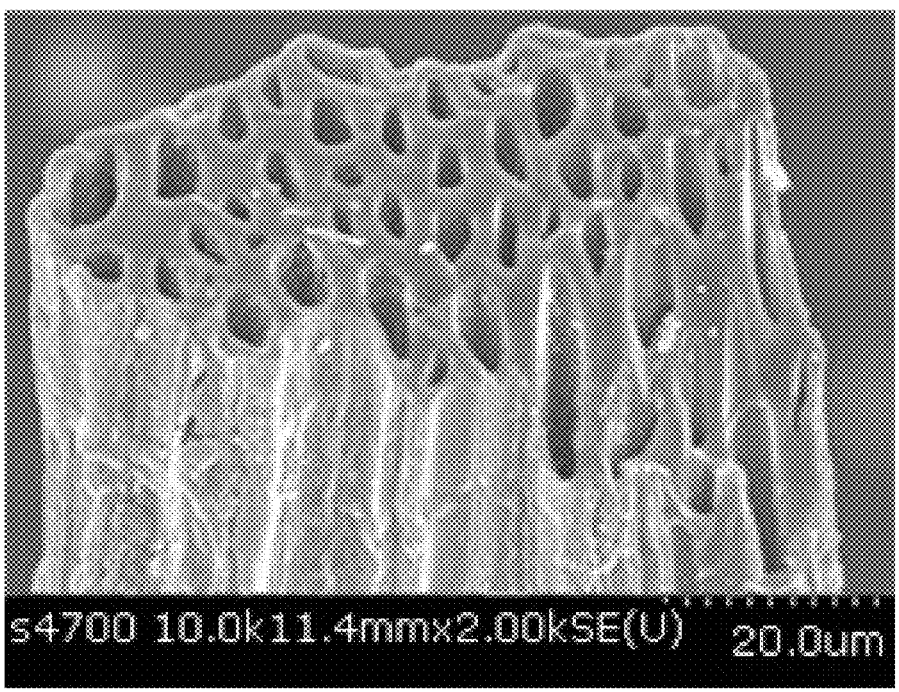

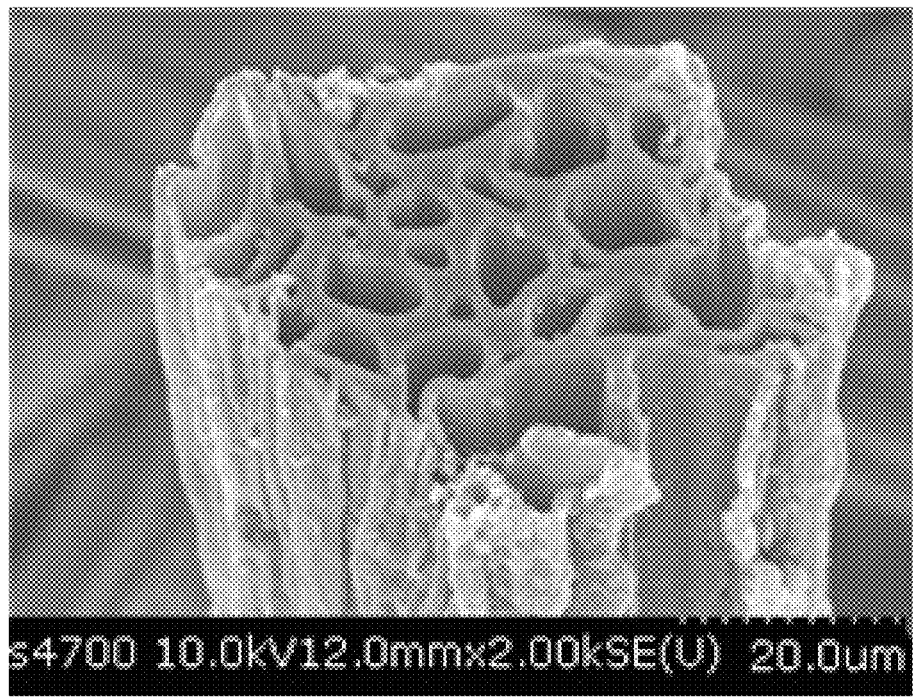
FIG. 1C
FIG. 1D
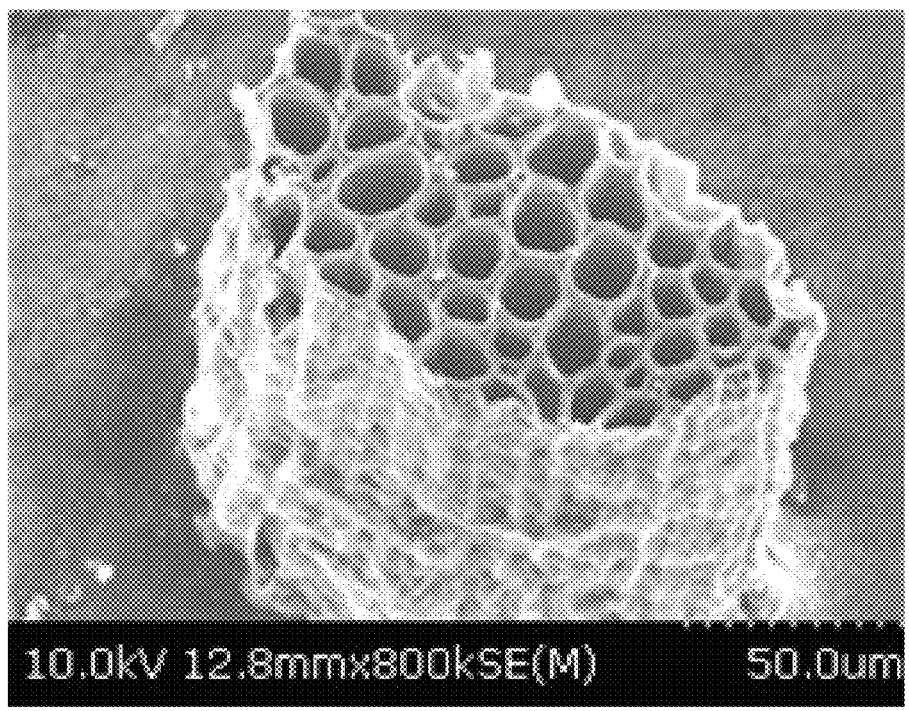

| | | |
|---|---|---|
| Fe | 0.30(+- 0.04) (wt%) | 6.528(+- 0.892) (cps) |
| Cu | 0.02(+- 0.01) (wt%) | 1.503(+- 0.719) (cps) |
| Zn | 0.11(+- 0.01) (wt%) | 11.024(+- 1.134) (cps) |
| Br | 0.01(+- 0.00) (wt%) | 1.971(+- 0.798) (cps) |
| Sr | 0.05(+- 0.00) (wt%) | 23.419(+- 1.933) (cps) |
| K | 2.52(+- 0.08) (wt%) | 165.267(+- 6.201) (cps) |
| Ca | 74.07(+- 0.36) (wt%) | 6015.595(+- 30.227) (cps) |
| Ti | 0.07(+- 0.03) (wt%) | 3.952(+- 1.847) (cps) |
| Cr | 0.02(+- 0.01) (wt%) | 2.808(+- 1.895) (cps) |
| Cl | 1.05(+- 0.06) (wt%) | 230.533(+- 12.627) (cps) |
| Na | 0.00(+- 205.00) (wt%) | 0.000(+- 7.538) (cps) |
| Mg | 17.46(+- 11.46) (wt%) | 12.883(+- 8.585) (cps) |
| Al | 4.32(+- 2.59) (wt%) | 16.718(+- 10.189) (cps) |

FIG. 7B

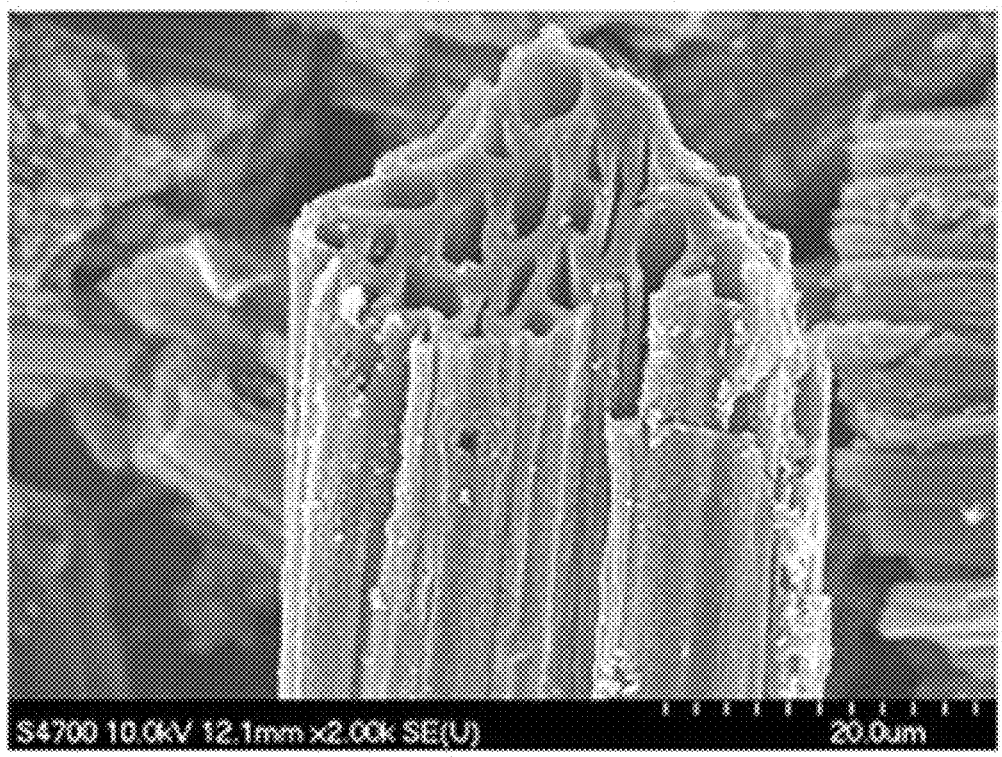
FIG. 8A
FIG. 8B
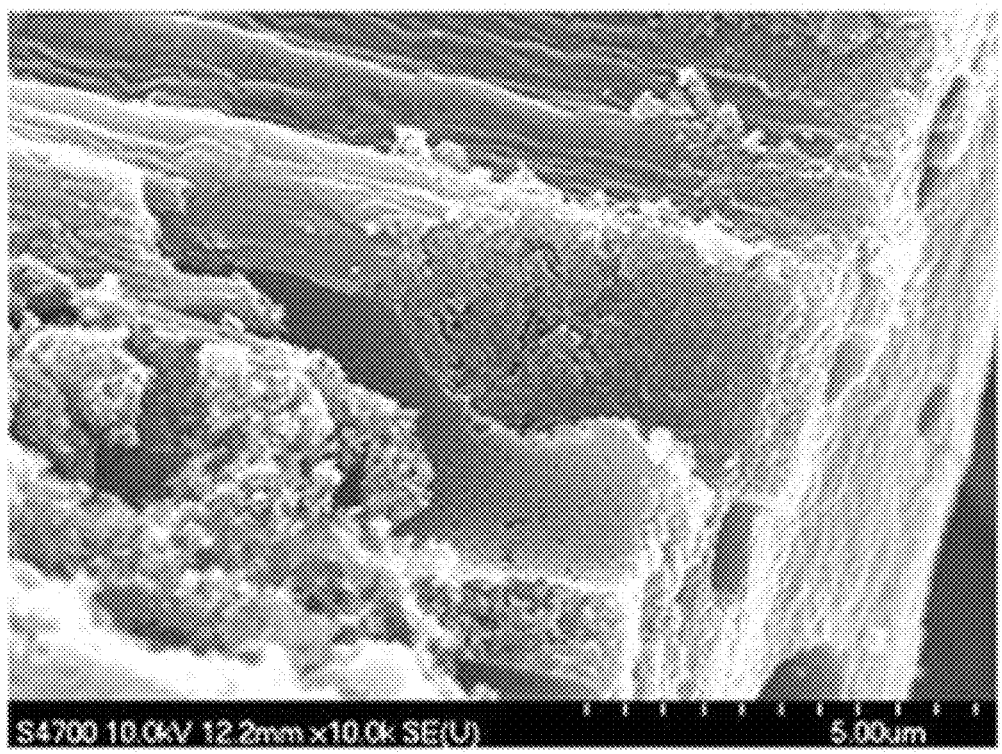

| | | |
|---|---|---|
| Mn | 0.66(+- 0.12) (wt%) | 6.501(+- 1.198) (cps) |
| Fe | 14.71(+- 0.36) (wt%) | 233.903(+- 5.891) (cps) |
| Ni | 0.12(+- 0.04) (wt%) | 3.398(+- 1.044) (cps) |
| Cu | 0.11(+- 0.03) (wt%) | 4.317(+- 1.068) (cps) |
| Br | 0.01(+- 0.00) (wt%) | 1.146(+- 0.779) (cps) |
| Sr | 0.10(+- 0.01) (wt%) | 25.095(+- 2.035) (cps) |
| V | 0.01(+- 0.01) (wt%) | 0.582(+- 0.853) (cps) |
| Zr | 0.02(+- 0.01) (wt%) | 2.395(+- 1.542) (cps) |
| K | 4.76(+- 0.17) (wt%) | 115.695(+- 4.876) (cps) |
| Ca | 48.58(+- 0.44) (wt%) | 1775.786(+- 16.646) (cps) |
| Ti | 1.74(+- 0.10) (wt%) | 68.255(+- 4.083) (cps) |
| Cr | 0.05(+- 0.03) (wt%) | 5.122(+- 2.700) (cps) |
| Al | 29.12(+- 22.52) (wt%) | 9.486(+- 7.453) (cps) |

FIG. 9B

| | | |
|---|---|---|
| Mn | 2.00(+- 0.12) (wt%) | 25.510(+- 1.507) (cps) |
| Fe | 2.95(+- 0.14) (wt%) | 61.640(+- 3.008) (cps) |
| Ni | 0.01(+- 0.02) (wt%) | 0.322(+- 0.740) (cps) |
| Cu | 0.02(+- 0.01) (wt%) | 0.997(+- 0.778) (cps) |
| Zn | 0.23(+- 0.02) (wt%) | 19.595(+- 1.377) (cps) |
| Br | 0.02(+- 0.00) (wt%) | 4.322(+- 0.896) (cps) |
| Pb | 0.07(+- 0.01) (wt%) | 23.307(+- 2.286) (cps) |
| Pt | 0.02(+- 0.02) (wt%) | 1.234(+- 1.120) (cps) |
| K | 51.21(+- 0.45) (wt%) | 1420.434(+- 14.381) (cps) |
| Ca | 14.57(+- 0.40) (wt%) | 341.204(+- 9.674) (cps) |
| Ti | 0.14(+- 0.04) (wt%) | 6.953(+- 2.043) (cps) |
| Pb | 0.03(+- 0.01) (wt%) | 2.602(+- 0.889) (cps) |
| Si | 23.00(+- 2.08) (wt%) | 126.259(+- 11.560) (cps) |
| P | 2.90(+- 0.67) (wt%) | 37.379(+- 8.907) (cps) |
| Cl | 2.36(+- 0.11) (wt%) | 300.396(+- 11.566) (cps) |

FIG. 11B

US 9,023,752 B2

METHOD OF PREPARING CATALYST USING ALKALI METAL OR ALKALINE EARTH METAL IN NATURAL CELLULOSE FIBERS AS CO-CATALYST AND DISPERSANT

CROSS-REFERENCE TO RELATED APPLICATIONS

This application claims the benefit of Korean Patent Application No. 10-2011-0040645, filed with the Korean Intellectual Property Office on Apr. 29, 2011, the disclosure of which is incorporated herein by reference in its entirety.

BACKGROUND OF THE INVENTION

1. Technical Field

The present invention relates to a method of preparing a catalyst using alkali metal and/or alkaline earth metal components inherently contained in natural cellulose fibers as a dispersant and a co-catalyst of catalytic metal particles, and more particularly, to a method of preparing a catalyst using alkali metal and alkaline earth metal components such as Ca, Mg, K, etc., which are inherently contained in the structure of natural cellulose fibers, as a dispersant and a performance improver.

2. Description of the Related Art

Recently, in the main research trends of catalyst fields, a first interesting development is the preparation of a support that is physically and chemically stable and has a large surface area with a uniform pore distribution adapted for a specific reaction, and a second interesting development is the preparation of a catalyst that exhibits the greatest activity at the lowest cost by supporting catalyst particles in a state of being highly dispersed while being minimized to a nanoscale.

Particularly in the case where a metal nanocatalyst is applied to a high-temperature catalytic reaction, most metal particles may agglomerate. Even when the dispersibility of catalyst particles that were first prepared is very high, the catalyst rapidly agglomerates and becomes undesirably deactivated at the same time when being exposed to the high-temperature reaction.

As the price of precious metal catalysts has increased considerably in recent years, catalysts for fuel cells and for $H_2$ preparation using precious metal catalysts such as Au and Pt are problematic in terms of being deactivated because of the agglomeration of metal. With the goal of overcoming such problems, a variety of attempts are being made to disperse a metal having no reaction activity in order to impart steric hindrance between metal particles, or to strengthen the interactions between the metal and the support to thereby prevent the transfer and agglomeration of the catalyst upon high-temperature catalytic reaction. However, satisfactory research results have not yet been reported to date.

Vizcaino et al. (Catalysis Today 146 (2009) 63-70) prepared a catalyst that is effective in a water vapor reforming reaction of ethanol by adding Mg and Ca to a Cu—Ni/SBA-15 catalyst. They also reported that the added Ca and Mg components improve the dispersibility of a CuNi catalyst, enhance the interaction between the support and the metal catalyst to increase catalytic performance, and lower the deactivation due to coke formation. Research results regarding improvements in catalytic performance and durability owing to the addition of alkaline earth metals were published in many reports in addition to the above paper (Cortright et al., Nature 418 (2002) 964; Pol el al. Carbon 42 (2004)111). However, methods of artificially adding an alkali metal and an alkaline earth metal to a catalyst for a reforming reaction have been studied. Research results for techniques for utilizing components such as, for example, Ca and Mg inherently contained in natural cellulose fibers have not yet been published.

Therefore, the present inventors continued research into preparation of catalysts having improved catalytic performance and durability without performing the artificial addition of alkali metal and alkaline earth metal components, leading to the development of a method of using highly dispersed alkali metal and alkaline earth metal nanoparticles that are inherently present in the structure of natural cellulose fibers as a dispersant and a performance improver.

SUMMARY OF THE INVENTION

Accordingly, an object of the present invention is to provide a method of preparing a catalyst using an alkali metal or an alkaline earth metal in natural cellulose fibers as a co-catalyst and a dispersant.

In order to accomplish the above object, the present invention provides a method of preparing a catalyst using an alkali metal or an alkaline earth metal in natural cellulose fibers as a co-catalyst and a dispersant, comprising thermally treating natural cellulose fibers to remove impurities from the natural cellulose fibers and to disperse the alkali metal or the alkaline earth metal in the form of nanoparticles in and on the fibers, chemically treating the thermally treated natural cellulose fibers with an acidic solution to introduce a functional group onto the surface of the fibers, thus preparing a cellulose support, and supporting metal catalyst nanoparticles on the surface of the chemically treated cellulose support using chemical vapor deposition or impregnation.

BRIEF DESCRIPTION OF THE DRAWINGS

The above and other objects, features and advantages of the present invention will be more clearly understood from the following detailed description taken in conjunction with the accompanying drawings, in which:

FIGS. 1A to 1D are scanning electron microscope (SEM) images showing changes in surface morphology of henequen fibers which were treated with electron beam irradiation and thermally treated (carbonized) at various temperatures according to an embodiment of the present invention, wherein the thermal treatment was performed for 2 hr in an $H_2/N_2$ atmosphere ($H_2/N_2$=1:1 volume ratio) and the temperature was raised from 25° C. at a rate of 10° C./min (the following thermal treatment conditions are the same as above);

FIGS. 8A and 8B show SEM images of kenaf fibers carbonized at 700° C. according to an embodiment of the present invention;

DESCRIPTION OF SPECIFIC EMBODIMENTS

Figure 2:
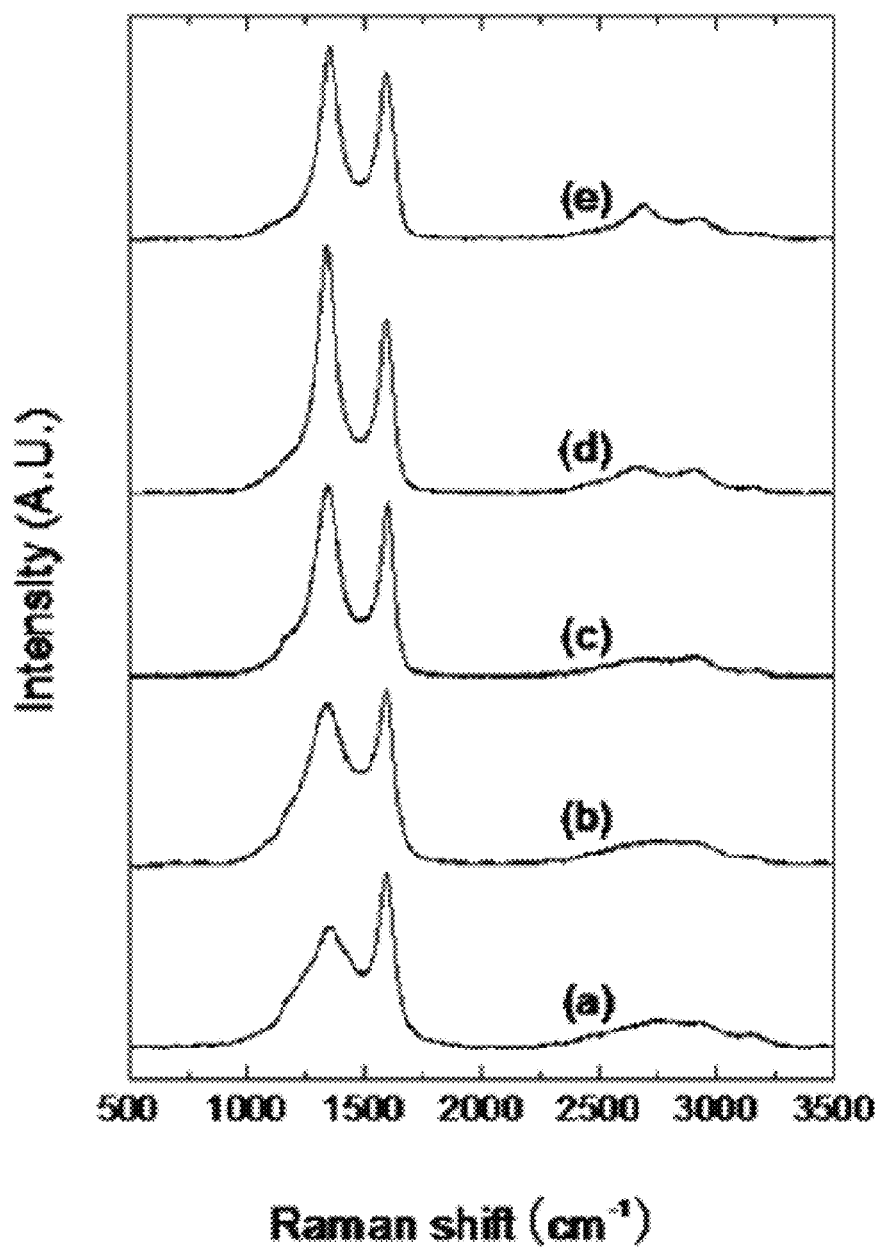
FIG. 2 shows Raman spectra of henequen fibers carbonized at different thermal treatment temperatures: (a) 500° C., (b) 700° C., (c) 900° C., (d) 1100° C. and (e) 1300° C.

According to the present invention, there is provided a method of preparing a catalyst using an alkali metal or an alkaline earth metal in natural cellulose fibers as a co-catalyst and a dispersant, comprising thermally treating natural cellulose fibers to remove impurities from the natural cellulose fibers and to disperse the alkali metal or the alkaline earth metal in the form of nanoparticles in and on the fibers, chemically treating the thermally treated natural cellulose fibers with an acidic solution to introduce a functional group onto the surface of the fibers, thus preparing a cellulose support, and supporting metal catalyst nanoparticles on the surface of the chemically treated cellulose support using chemical vapor deposition (CVD) or impregnation.

Below is a detailed description of the method of preparing the catalyst according to the present invention.

In the present invention, a natural cellulose material that is capable of obtaining a large surface area without performing a specific pretreatment process such as activation is used. Also even without performing artificial addition of a dispersant and a co-catalyst, alkali metal or alkaline earth metal components such as K, Ca and Mg inherently contained in the cellulose structure are used as a dispersant and a performance improver. Thereby, activity and durability of a catalyst used for the high-temperature reaction may be remarkably improved.

Conventionally, in the case where a metal-supported catalyst is used for a high-temperature catalytic reaction, an alkali metal and/or an alkaline earth metal such as K, Ca, Mg, etc., are artificially added, as well as the catalytic metal, in order to prevent the dispersibility of metal particles from decreasing with an increase in the reaction temperature, suppress the sintering and agglomeration of metal particles, and decrease the deactivation due to deposition of reaction by-products in the course of the reaction. That is, the alkali metal and/or the alkaline earth metal are used as a co-catalyst.

In the present invention, a natural cellulose material, which inherently contains alkali metal and/or alkaline earth metal components without the need to perform the artificial addition as mentioned above, is used. These alkali metal and/or alkaline earth metal components were confirmed to be inherently present in the form of highly dispersed nanoparticles in natural cellulose even without additional treatment. Also, according to the present invention, when natural cellulose fibers are thermally treated, impurities having a low boiling point such as wax or pectin are removed from the natural cellulose, and thus the alkali metal and/or alkaline earth metal components present in the fibers are exposed to the inside and outside the porous fibers and the crystallinity of the metal is increased. Hence, carbonized natural cellulose fibers are intended to be utilized as a high-performance catalytic support and a catalyst.

In the case where a variety of metal catalyst particles are supported on the surface of the cellulose structure, the dispersibility of metal catalyst particles is increased and the interaction between the metal and the support is enhanced thanks to the effects of alkali metal and/or alkaline earth metal components. Furthermore, the agglomeration and sintering of metal catalyst particles that are regarded as problematic upon high-temperature catalytic reaction may be retarded, ultimately considerably increasing the durability of the catalyst.

Conventionally, in order to retard the agglomeration and sintering of metal catalyst particles and improve durability of the catalyst, the alkali metal and/or alkaline earth metal components are artificially added. However, in the case of a catalytic support using the natural cellulose material according to the present invention, it is advantageous because metal nanoparticles are inherently highly dispersed in the cellulose fibers and may thus be directly used as a dispersant and a performance improver.

The kind of natural cellulose usable in the present invention is not limited. Any natural cellulose biomass may be used as a material of the present invention. For example, natural cellulose may be selected from the group consisting of henequen fibers, kenaf, abaca, bamboo, hemp, flax, jute, pineapple, ramie, sisal, rice straw, barley straw, wheat straw, rice husk and mixtures thereof, but is not necessarily limited thereto.

In the method according to the present invention, thermally treating the natural cellulose fibers is performed to remove impurities such as wax and pectin from the natural cellulose fibers and increase the surface area and porosity. Also, the thermal treatment may increase crystallinity of alkali metal and/or alkaline earth metal components in the natural cellulose fibers, wherein such alkali metal or alkaline earth metal components are uniformly dispersed in the form of nanoparticles in the cellulose fibers.

Any alkali metal and alkaline earth metal may be used so long as they are widely known in the art. For example, the alkali metal is selected from the group consisting of Li, Na, K and mixtures thereof, and the alkaline earth metal is selected from the group consisting of Ca, Mg and mixtures thereof, but the alkali metal and the alkaline earth metal are not necessarily limited thereto.

According to an embodiment of the present invention, the natural cellulose fibers are separated into thin fibers of tens to hundreds of $\mu m$, and such fine fibers are cut to short fibers having a length of 1~2 mm in liquid nitrogen. Thereafter, the natural cellulose fibers thus cut are heated to 500~1800° C. at a heating rate of 5~20° C./min in an atmosphere of $H_2$ and $N_2$ at 1:1, and then maintained at 500~1800° C. for 0.5~2 hr thus obtaining carbonized cellulose. Also, in the case of a high-temperature catalytic reaction such as a reforming reaction, the stability of a support may increase at a high temperature of at least 1100° C., making it suitable to apply the support to the catalytic reaction. In this procedure, impurities are removed from the natural cellulose fibers, and thus the thickness of the wall of the fibers is decreased, and the space that has been occupied by impurities (composed mainly of wax and fat components) may be kept in the form of inner pores. In the case of cellulose fibers treated at a temperature higher than 1100° C., the pores become large and the pore volume is decreased and simultaneously the surface area is drastically reduced due to high-temperature treatment. As the carbonization temperature increases, the ratio of metal content relative to the carbon content of a sample may change, and the carbonization temperature may be set depending on the end uses of carbonized materials.

Subsequently, in order to introduce a functional group onto the surface of the thermally treated natural cellulose fibers, such fibers are chemically treated with an acidic solution, thus preparing the cellulose support. More specifically, the surface of the thermally treated natural cellulose fibers is chemically treated with the acidic solution so that a functional group such as CO—, CH—, O—C=O, $CO_2$, $CO_3$, etc., is imparted thereon, thus obtaining the cellulose support.

According to an embodiment of the present invention, the chemical treatment of the natural cellulose fibers with the acidic solution to impart the surface thereof with a functional group is carried out by immersing the thermally treated natural cellulose fibers in a 0.1~0.5 mol sulfuric acid aqueous solution and then performing 10~60 treatments at a sweep rate of 50 mV/s in the voltage range of −0.15~1.3 V. Thereafter, immersion in a 30% nitric acid solution (or a 14 N nitric acid solution) at 100~150° C. and treatment for 10 min~20 hr may be carried out, or the natural cellulose fibers may be immersed in a mixture solution of nitric acid (14 M, 50 ml) and sulfuric acid (98%, 50 ml) or a mixture solution of 98% sulfuric acid and 70% nitric acid at a volume ratio of 3:1 and then treated for 5 min~6 hr while being refluxed at 50~70° C. The natural cellulose fibers thus treated are sufficiently washed with distilled water, filtered, and dried at 110° C. for 12 hr, thus obtaining the cellulose support to be used as a final catalytic support.

Subsequently, metal catalyst nanoparticles are supported on the surface of the chemically treated cellulose support using CVD or impregnation.

The metal catalyst nanoparticles supported on the surface of the cellulose support may include Pt, Au, Ag, Ni, Co, Ru, Pd or Mo nanoparticles. As such, CVD or impregnation may be applied in order to support the metal catalyst nanoparticles on the surface of the cellulose support.

According to an embodiment of the present invention, supporting the metal catalyst nanoparticles on the surface of the cellulose support using CVD may be performed through the following procedures. Specifically, the cellulose support obtained by being dispersed in the form of nanoparticles and then being chemically treated is positioned at the center of a quartz tube installed at the center of a furnace, maintained at 100~120° C. at a pressure of 6~10 torr for 30~120 min to remove impurities from the inside of the quartz tube, and then maintained for 1 hr or longer while allowing nitrogen (50~300 sccm) to flow thereto. In order to treat the metal catalyst nanoparticles using CVD, the inner temperature of the quartz tube is changed to 80~300° C. at a heating rate of 10° C./min, and a gaseous metal precursor material begins to flow at the point of time at which the inner temperature of the tube reaches the reaction temperature, so that metal catalyst nanoparticles are supported on the surface of the catalytic support. The metal precursor is placed in an evaporator of an oven in advance before use. For example, in the case of a Pt precursor ($MeCpPtMe_3$), when the reactor is heated to 60~80° C. to reach the reaction temperature, the cock of the connection pipe is opened so that the gaseous metal precursor is transferred to the cellulose support in the reactor. The cellulose support is maintained at the reaction temperature (80~300° C.) for 30 min~24 hr. As the reaction time increases, the amount of metal catalyst nanoparticles supported on the surface of the cellulose support is increased.

A Pt precursor for supporting the Pt particles on the surface of the cellulose support may be selected from the group consisting of methyltrimethylcyclopentadiethyl platinum ($MeCpPtMe_3$), $Pt(Me)_3(Cp)$, $Pt(Tfacac)_2$, $Pt(Me)(CO)(Cp)$, $Pt(Me)_2(COD)$, $[PtMe_3(acac)]_2$ (acac; acetylacetonato ligand), $PtCl_2(CO)_2$, $Pt(PF_3)_4$, $Pt(acac)_2$ and $Pt(C_2H_4)_3$, but is not necessarily limited thereto.

In addition, the metal precursor may include a Ru compound such as ruthenium chloride ($RuCl_3$), ruthenium acetylacetonate ($Ru(CH_3COCHCOCH_3)_3$), bisethylcyclopentadienyl ruthenium (($C_6H_5)_2Ru$) or bis(2,4-dimethylpentadienyl) ruthenium (II) ($Ru[(CH_3)_2C_5H_5]_2$), an Ag compound such as a silver 2,2-dimethylbutyrate complex ($Ag_2(CH_3CH_2C(CH_3)_2COO)_2(PMe_3)_2$), a Pd compound such as palladium diacetate ($(CH_3COO)_2Pd$), a Ni compound such as nickel nitrate ($Ni(NO_3)_2$) or nickel carbonyl ($Ni(CO)_4$), a Co compound such as dicarbonylcyclopentadienyl cobalt, $Co(CO)_3$ NO or $Co(NO_3)_2$, and a Mo compound such as $Mo(CO)_6$.

The CVD used in the present invention is advantageous because, even when the reaction time is lengthened, the size of metal catalyst nanoparticles is not increased or the dispersibility thereof is not lowered and a predetermined nanoscale may be maintained and only the supported amount may be effectively increased.

According to an embodiment of the present invention, supporting the metal catalyst nanoparticles on the surface of the cellulose support using impregnation may be performed through the following procedures. As such, the above-mentioned metal precursor may be used as a metal precursor suitable for supporting metal catalyst nanoparticles on the cellulose support chemically treated with the acidic solution. The cellulose support is immersed in the metal precursor aqueous solution (0.1~1 mol) and ultrasound is then applied thereto for 5 min~3 hr, after which the state of the cellulose support being immersed is maintained for 12 hr. The slurry solution having the cellulose support immersed therein is filtered, dried in an oven at 100~120° C. for 12 hr or longer, and then burned in a furnace at 400~600° C. in a $N_2$ atmosphere for 2~6 hr, finally obtaining a catalyst supported on the surface of the cellulose support.

In the case where Pt catalyst nanoparticles are supported on the surface of the cellulose support, the resulting catalyst is effective at hydrogenation of tetralin or benzene, oxidation of methanol, ethanol and phenol, etc.

In the case where Pt catalyst nanoparticles are supported on the surface of the cellulose support and a co-catalyst such as Ru or Co is additionally supported thereon, the resulting catalyst may be very usefully applied to decrease poisoning caused by CO in a fuel cell electrode reaction or to promote the oxygen reduction reaction.

In the case where Pd nanoparticles are supported on the surface of the cellulose support, the resulting catalyst is favorable in terms of selective hydrogenation of hydrocarbons and fuel cell electrode reaction, in lieu of the Pt catalyst.

In the case where Ag nanoparticles are supported on the surface of the cellulose support, the resulting catalyst is very useful as an adsorbent. Also, when it is used as a co-catalyst of another precious catalyst (Pd, etc.), it is useful for selective hydrogenation of hydrocarbons and may be applied to a variety of reactions, including oxidation of CO, dehydrogenation of propane, reduction of nitrogen oxide (NOx), oxidation of benzylalcohol, etc.

In the case where Ni catalyst nanoparticles are supported on the surface of the cellulose support, the resulting catalyst is considerably effective at a reforming reaction for $H_2$ preparation, and may also be very useful in desulfurization, denitrilization, demetalization, etc.

In the case where Mo catalyst nanoparticles are supported on the surface of the cellulose support, the resulting catalyst is very effective at desulfurization, denitrilization, demetalization, etc.

In the case where Co catalyst nanoparticles are supported on the surface of the cellulose support, the resulting catalyst may be used as a co-catalyst for desulfurization, denitrilization and demetalization, and may also be utilized as a co-catalyst of a platinum catalyst for a fuel cell, and additionally, as a catalyst for a Fisher-Tropsch reaction, a catalyst for oxidation and partial oxidation of hydrocarbon, a catalyst for reforming and amination of ethanol, a catalyst for hydrogenation, a catalyst for substitution of aqueous gas, etc.

The following examples that are set forth to illustrate but are not to be construed as limiting the present invention may provide a better understanding of the present invention, and those skilled in the art will appreciate that a variety of modifications and variations are possible within the scope and spirit of the present invention and such modifications and variations belong to the attached claims.

EXAMPLES

Example 1

Preparation of Cellulose Support Using Henequen Fibers and Preparation of Ni Nanocatalyst Using the Same as Catalytic Support (1) Thermal Treatment of Natural Henequen Fibers Under Specific Conditions In order to remove impurities from natural henequen fibers and increase the surface area and porosity thereof, natural henequen fibers were thermally treated under specific conditions. Henequen fibers were separated into thin fibers of tens~hundreds of μm, which were then cut into short fibers having a length of 1~2 mm in liquid nitrogen. The henequen fibers thus cut were heated to 500~1500° C. at a heating rate of 5~20° C./min in a $N_2$ gas mixture atmosphere containing 5~50% $H_2$, and then maintained at 500~1500° C. for 1 hr so that the henequen fibers were carbonized.

(2) Introduction of Functional Group on the Thermally Treated Henequen Fibers Using Chemical Treatment to Facilitate the Supporting of Metal Nanocatalyst The henequen fibers thermally treated in (1) were immersed in a 0.5 mol sulfuric acid aqueous solution and then treated 10~60 times at a sweep rate of 50 mV/s in the voltage range of −0.15~1.3 V. The henequen fibers were immersed in a mixture solution of nitric acid (14 M, 50 ml) and sulfuric acid (98%, 50 ml) at a volume ratio of 3:1 and then treated for 10 min while being refluxed at 60° C. The treated sample was sufficiently washed with distilled water, filtered, and dried at 110° C. for 12 hr, thus obtaining a cellulose support useful as a final catalytic support.

(3) Supporting of Metal Nanocatalyst on the Surface of the Cellulose Support Obtained by Pretreatments (1) and (2) Using CVD In order to support a Ni nanocatalyst on the surface of the cellulose support obtained by (1) and (2) in sequence using impregnation, carbonized cellulose subjected to surface treatment was prepared, and nickel nitrate ($Ni(NO_3)_2$) as a Ni precursor was dissolved in distilled water thus preparing a 1 mol precursor aqueous solution. The Ni aqueous solution was added so that the carbonized cellulose was sufficiently immersed, and applying ultrasound for 30 min was repeated 2~5 times, whereby the aqueous solution was efficiently transferred to the inside of pores of the support. Subsequently, the carbonized cellulose was allowed to stand for 12~24 hr in a state of being immersed in the Ni aqueous solution, filtered using filter paper, dried in an oven at 110° C. for 12 hr or more and then burned in a furnace at 450° C. for 4 hr in a $N_2$ atmosphere, finally obtaining a cellulose catalyst having Ni particles supported thereon.

Example 2

Preparation of Cellulose Support Using Kenaf and Preparation of Ni Nanocatalyst Using the Same as Catalytic Support A cellulose support was prepared in the same manner as in Example 1, with the exception that kenaf was used as a support source instead of henequen fibers, and a Ni nanocatalyst was prepared using such a catalytic support.

Example 3

Preparation of Cellulose Support Using Rice Straw and Preparation of Ni Nanocatalyst Using the Same as Catalytic Support A cellulose support was prepared in the same manner as in Example 1, with the exception that rice straw was used as a support source instead of henequen fibers, and a Ni nanocatalyst was prepared using such a catalytic support.

Comparative Example 1

Preparation of $Ni/Al_2O_3$ Catalyst Via Incipient Impregnation Using Commercially Available $\gamma$-$Al_2O_3$ as Catalytic Support (1) Supporting of Ni Precursor on $\gamma$-$Al_2O_3$ Via Incipient Impregnation $\gamma$-$Al_2O_3$ (97%, Strem) was used as a support, and nickel nitrate ($Ni(NO_3)_2$) as a Ni precursor was dissolved in distilled water thus preparing a 1 mol precursor aqueous solution. Thereafter, $Al_2O_3$ dried in an oven at 110° C. for 12 hr or longer was used, and incipient impregnation was applied, thus obtaining a $Ni/Al_2O_3$ catalyst.

(2) Preparation of Metal Catalyst in Oxide Form Via Drying and Burning

The catalyst having the Ni precursor supported using incipient impregnation was dried in an oven at 110° C. for 12 hr or more and treated in a furnace at 450° C. for 4 hr in a $N_2$ atmosphere, finally obtaining a $Ni/Al_2O_3$ catalyst in oxide form.

TEST EXAMPLES

Changes in properties, components and metal contents of cellulose fibers in proportion to an increase in thermal treatment temperature, the distribution of alkali metal and alkaline earth metal present in the carbonized cellulose, and the interaction between the metal and the carbonized fibers were analyzed. The catalysts comprising the cellulose support treated at different temperatures and the Ni particles supported thereon were tested in $CO_2$ reforming of $CH_4$. The results are summarized as below.

Test Example 1

Changes in Properties of Henequen Fibers with Respect to Thermal Treatment Conditions In (1) of Example 1, the natural henequen fibers were thermally treated at different temperatures, and the resulting samples were analyzed using SEM. The results are shown in FIG. 1A to 1D.

FIG. 1A shows the sample after thermal treatment at 500° C. for 2 hr ($H_2:N_2=1:1$ volume ratio). FIG. 1B shows the sample after thermal treatment at 700° C. for 2 hr ($H_2:N_2=1:1$ volume ratio). FIG. 1C shows the sample after thermal treatment at 900° C. for 2 hr ($H_2:N_2=1:1$ volume ratio). FIG. 1D shows the sample after thermal treatment at 1100° C. for 2 hr ($H_2:N_2=1:1$ volume ratio). As shown in FIGS. 1A~1D, when the treatment temperature was increased, the inner channels of the henequen structure were maintained unchanged but the thickness of the wall thereof was decreased. This is considered to be because impurities such as wax or pectin are gradually removed in proportion to an increase in the thermal treatment temperature, thus forming a graphite-like hard structure.

Test Example 2

Changes in Components of Henequen Fibers with Respect to Thermal Treatment Conditions In (1) of Example 1, the natural henequen fibers were thermally treated at different temperatures, and the properties of the resulting carbonized samples were analyzed using Raman spectroscopy. The results are shown in FIG. 2.

As shown in FIG. 2, two peaks for amorphous carbon were observed at 1344 $cm^{-1}$ (corresponding to the D peak) and 1581 $cm^{-1}$ (corresponding to the G peak). Typically the degree of graphitization is determined from the ratio ($I_D/I_G$) of intensity of the D peak to intensity of the G peak. As the thermal treatment temperature increases, the amount of graphite increases, so that the above ratio generally decreases. However, in the case of the henequen sample carbonized at 1100° C. or lower as shown in FIG. 2, the above ratio was rather increased. This is considered to be because the carbonization temperature of the samples (a)~(d) is 1100° C. or less that is lower than the typical graphitization temperature (about 1500° C. or higher), making it difficult to determine the difference in $I_D/I_G$ with respect to the degree of graphitization. However, in the low temperature range of 1100° C. or less, the single basic structural unit of the graphite structure is converted from a disordered state into an arrangement state in proportion to an increase in the temperature, thus increasing the ratio of $I_D/I_G$. Whereas, in the case of (e), the ratio of $I_D/I_G$ decreases, from which graphitization is seen to gradually progress at 1100° C. or higher.

Test Example 3

Changes in Components of Henequen Fibers with Respect to Thermal Treatment Conditions In (1) of Example 1, the natural henequen fibers were thermally treated at different temperatures, and the components of the resulting samples were analyzed using thermogravimetric analysis (TGA) and energy dispersive X-ray fluorescence (ED-XRF). Specifically, the remaining metal contents were analyzed using TGA (air atmosphere, heating to 20~1000° C.), and the qualitative analysis (content ratio) of metal components was conducted using ED-XRF, and thus accurate quantitative and qualitative analysis of metal components in the cellulose fibers was performed. The results are shown in Table 1 below.

TABLE 1

| Carbonization temperature [a] (° C.) | Component (wt %) | | |
| --- | --- | --- | --- |
| | C | Ca | Mg |
| 500 | 98.50 | 1.50 | — |
| 700 | 97.69 | 2.25 | 0.06 |
| 900 | 97.20 | 2.67 | 0.13 |
| 1100 | 95.86 | 3.89 | 0.31 |
| 1300 | 94.19 | 5.34 | 0.47 |

[a] Each sample was carbonized in $H_2/N_2$ flow ($H_2/N_2$ = 1:4 vol. ratio) for 2 hr, then treated by a mixture solution of sulfuric acid (98% $H_2SO_4$, 50 ml) and nitric acid (14M $HNO_3$, 50 ml) at 60° C. for 3 hr.

As is apparent from Table 1, the structure of carbonized cellulose support contained a variety of kinds of alkaline earth metals such as Ca, Mg, etc., and the amounts of these metal components were increased in proportion to an increase in the thermal treatment temperature (carbonization temperature). The carbonized cellulose was converted from an amorphous structure at low temperature into a hard graphite structure having increased crystallinity at raised carbonization temperature.

Test Example 4

TEM and EDAX Analysis of Carbonized Henequen Via Thermal Treatment

In (1) of Example 1, the natural henequen fibers were thermally treated at different temperatures, and the structure of the resulting samples was analyzed using transmission electron microscopy (TEM) and the composition of the surface thereof was analyzed using energy-dispersive X-ray analysis (EDAX). The results are shown in FIGS. 3A and 3B.

Figure 3:
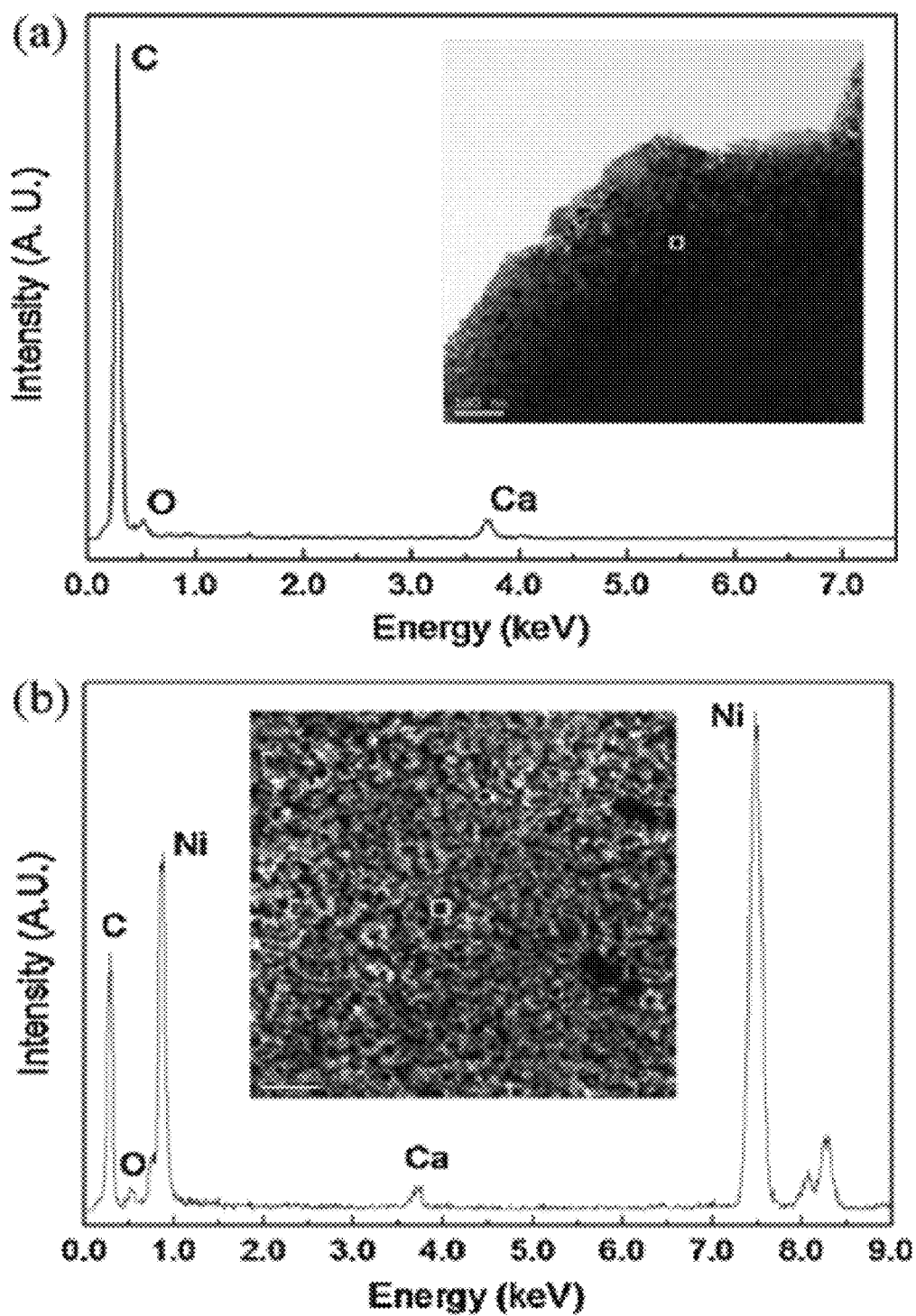
FIGS. 3A and 3B are TEM images and EDAX patterns of henequen fibers (1100° C.) and Ni/cellulose (1100° C.) according to an embodiment of the present invention.

FIG. 3A shows the TEM and EDAX results of the henequen sample after thermal treatment at 1100° C. In FIG. 3A, the TEM results inserted in the graph showed that black particles regarded as the metal components were dispersed. Such particles were analyzed using EDAX, from which a considerable amount of Ca particles in addition to the C component was seen to be contained. Although the Mg component should be detected, the amount thereof is smaller than that of Ca and thus Mg is considered to not be seen in the EDAX results. FIG. 3B shows the TEM results of the sample comprising the Ni catalyst supported on the surface of the henequen carbonized at 1100° C., wherein the metal particles are seen to be uniformly dispersed. The surface of the sample was analyzed using EDAX, and thus the peak of supported Ni was greatly observed in addition to the C peak, and furthermore the peak of Ca inherently present in the henequen fibers was observed.

Test Example 5

Figure 4:
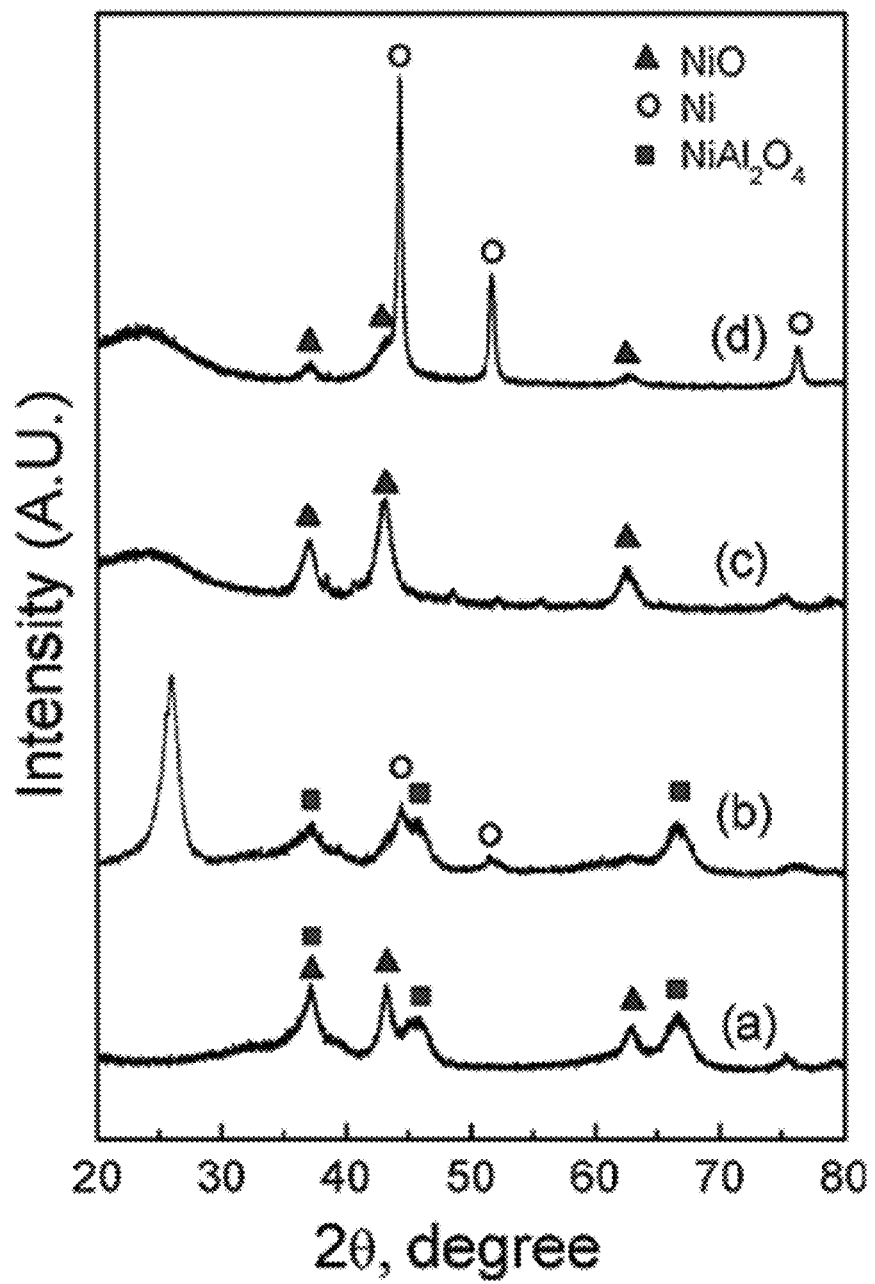
FIG. 4 shows XRD patterns of (a) Ni/$Al_2O_3$ (before a reforming reaction-raw), (b) Ni/$Al_2O_3$ (after a reforming reaction for 168 hr), (c) Ni/cellulose (1100° C.) (raw) and (d) Ni/cellulose (1100° C.) (after a reforming reaction for 168 hr)
Figure 6:
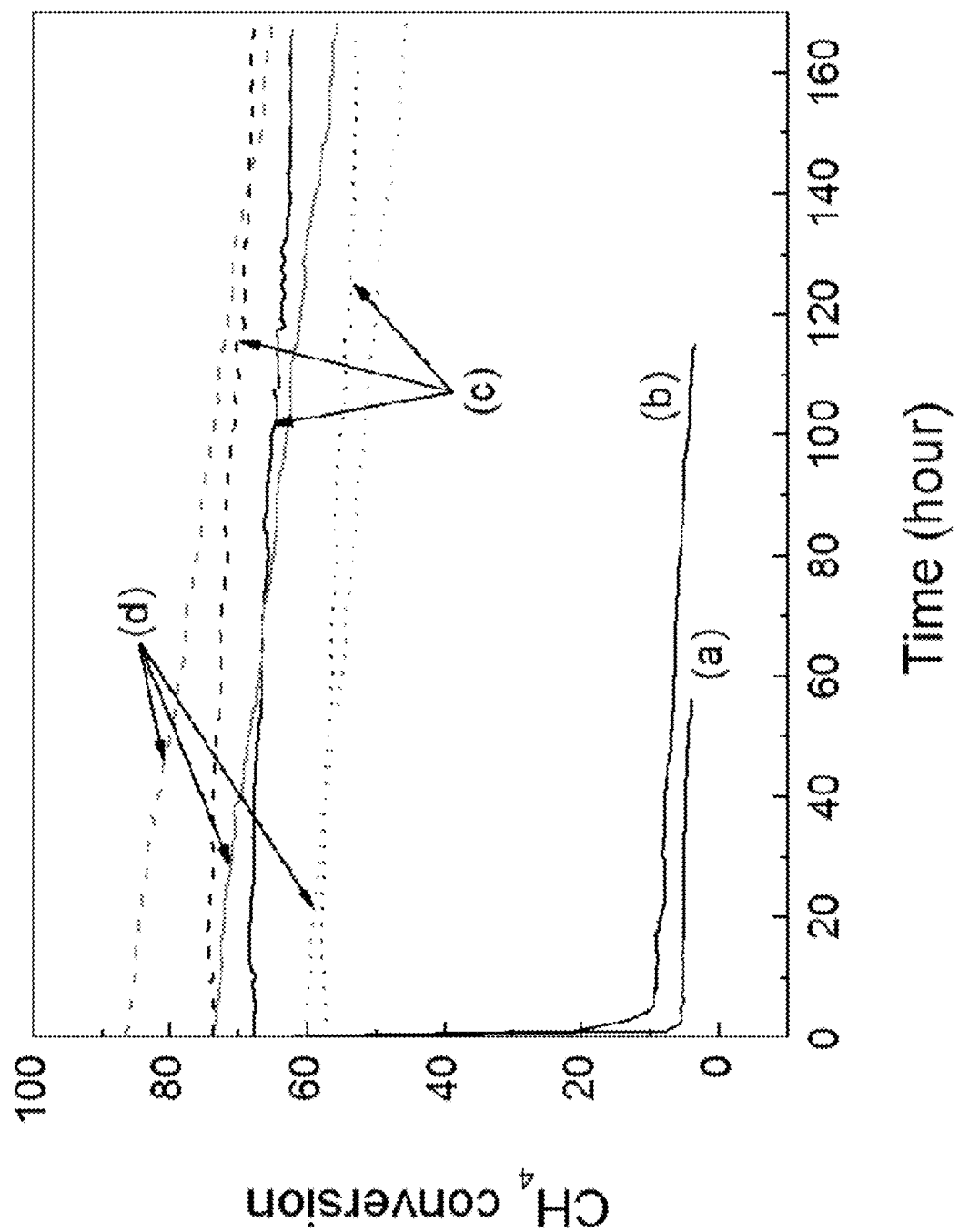
FIG. 6 shows $CH_4$ conversion (solid line), $CO_2$ conversion (dashed line) and $H_2$ yield (dotted line) upon $CO_2$ reforming of $CH_4$ using (a) Ni/cellulose (700° C.), (b) Ni/cellulose (900° C.), (c) Ni/cellulose (1100° C.) and (d) Ni/$Al_2O_3$.

XRD Analysis of Ni Catalyst Supported on Henequen Carbonized at Different Temperatures In (1) of Example 1, the natural henequen fibers were thermally treated at different temperatures, and the resulting samples were supported with the Ni catalyst and then used for $CO_2$ reforming of $CH_4$ for 168 hr. The catalysts before/after the reaction were recovered and analyzed via XRD. The results are summarized in FIG. 4. For comparison with the Ni/henequen catalyst, a typical Ni/$Al_2O_3$ catalyst used for a reforming reaction was reacted under the same conditions. The results are shown in (a) and (b) of FIG. 4. In FIG. 4, (a) shows the Ni/$Al_2O_3$ catalyst of Comparative Example 1 before the reforming reaction, wherein the peaks of NiO and $NiAl_2O_4$ are observed. In FIG. 4, (b) shows the results of using the catalyst of (a) for the reforming reaction for 168 hr, wherein the catalyst in oxide form (NiO) is reduced and applied to the reaction, and thus elemental Ni is mainly observed. The size of Ni particles calculated from (a) of FIG. 4 is 9 nm, and the size of Ni particles after the reforming reaction calculated from (b) is 21 nm. On the other hand, (c) of FIG. 4 shows the Ni catalyst supported on the surface of the carbonized henequen according to the present invention wherein the peak of NiO is mainly observed, and (d) of FIG. 4 shows the analysis results of the catalyst of (c) that was reduced and then used for the reforming reaction for 168 hr. In the case of (c), the calculated Ni particle size is 7 nm, which is smaller than the size (a) of the Ni particles supported on the surface of $Al_2O_3$ of Comparative Example 1. Also in the case of (d) used for the reforming reaction for 168 hr, the particle size is about 10 nm. When the Ni catalyst is supported on the carbonized henequen of the present invention compared to when supported on $Al_2O_3$, changes in the particle size even after the long-time/high-temperature reaction are not large. This is considered to be due to the effects of Ca, Mg, etc. present in the Ni/henequen catalyst. Specifically, the alkali metal and/or alkaline earth metal present in the catalyst used for the high-temperature reaction such as the reforming reaction may improve the dispersibility of the Ni catalyst particles. Also when the catalyst of the present invention is applied to the high-temperature reaction, the alkali metal and/or alkaline earth metal of natural cellulose fibers may suppress the agglomeration of particles to thus enhance durability, and may prevent the sintering of catalyst particles. This is because the alkali metal and/or alkaline earth metal components may cause strong metal-support interaction (SMSI) between the catalytic metal Ni and the support. Hence, the Ni particles supported on the surface of the carbonized henequen according to the present invention are not greatly changed in terms of the particle size even after the reaction, and the reaction activity is almost the same. The reaction activity results are shown in FIG. 6 in the following Test Example 7.

Test Example 6

Figure 5A:
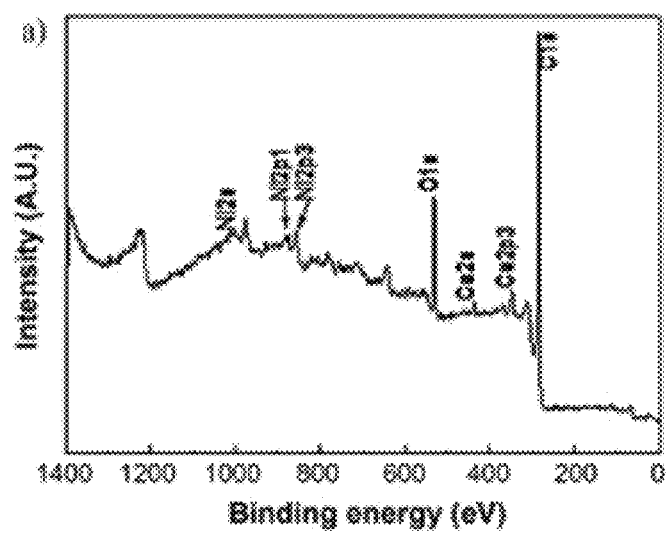
FIG. 5A shows XPS spectra of Ni/cellulose (1100° C.)
Figure 5B:
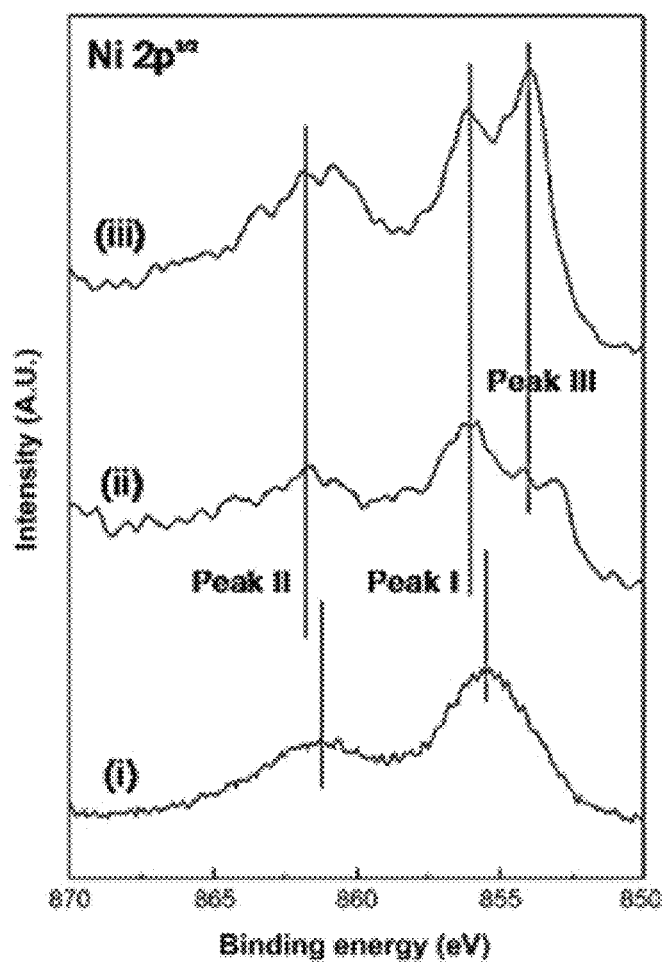
FIG. 5B shows Ni2p$_{3/2}$ XPS spectra of (i) Ni/$Al_2O_3$, (ii) Ni/cellulose (1100° C.) (raw) and (iii) Ni/cellulose (1100° C.) (after a reforming reaction for 168 hr)

XPS Analysis of Ni Catalyst Supported on Henequen Carbonized at Different Temperatures In (1) of Example 1, the henequen fibers were thermally treated at 1100° C. thus obtaining the carbonized henequen the surface of which was then supported with Ni catalyst, and the resulting catalyst was used for $CO_2$ reforming of $CH_4$ for 168 hr. The catalysts before/after the reaction were recovered and then analyzed using X-ray photoelectron spectroscopy (XPS). The results are shown in FIGS. 5A and 5B. For comparison with a typical catalyst, the Ni/$Al_2O_3$ comprising commercially available $Al_2O_3$ and Ni catalyst supported thereon obtained using impregnation in Comparative Example 1 was subjected to the same analysis. The results are shown in (i) of FIG. 5B.

In the case of the Ni/$Al_2O_3$ catalyst shown in (i) of FIG. 5B, the spectra of $Ni2p_{3/2}$ displayed a major peak at 855.4 eV (peak I) and a satellite peak at 861.2 eV (peak II), which corresponds to the $Ni^{2+}$ in NiO. The peak I and the peak II at the above positions in the typical case are seen to shift to 856.1 eV (peak I) and 861.8 eV (peak II) as shown in (ii) of FIG. 5B in the case of the carbonized henequen. In this way, the henequen catalyst may exhibit binding energy that is comparatively higher compared to the alumina catalyst. This is because the bondability between the support and the catalytic metal is enhanced due to the presence of alkali metal such as Ca and Mg in the cellulose fibers as mentioned above in Test Example 5. The SMSI due to the presence of the alkali metal and/or alkaline earth metal may remarkably retard the agglomeration that frequently occurs upon applying the catalyst to the high-temperature reaction, greatly contributing to decreasing the catalyst cost in actual processes as well as imparting the technical meaning.

Test Example 7

Catalytic Reforming Using Catalyst having Henequen Support and Commercially Available Catalyst Each of the catalysts of Example 1 and Comparative Example 1 was used for $CO_2$ reforming of $CH_4$. The results are shown in FIG. 6.

In FIG. 6, (a) shows the results of the catalyst comprising a henequen support thermally treated at 700° C. and a 20 wt % Ni catalyst supported thereon being used for the reforming reaction, (b) shows the results of using the Ni catalyst comprising henequen thermally treated at 900° C., and (c) shows the results of using the Ni catalyst comprising a henequen support thermally treated at 1100° C. In (a) and (b), the reforming reaction activity is slightly represented in the early stage, but then immediately deteriorates. This is considered to be because the henequen support treated at 900° C. or less is mostly amorphous and is unstable in the reforming reaction at high temperature. Although (c) shows the initial activity ($CH_4$ conversion 68%) slightly smaller than the initial activity of the Ni/$Al_2O_3$ catalyst of Comparative Example 1 ((d) of FIG. 6, $CH_4$ conversion 74%), the conversion values of (c) and (d) are almost the same after a lapse of the reaction time of about 60 hr, and then the conversion by the Ni/henequen catalyst is greatly increased instead. This is because, as is apparent from the Raman results of Test Example 2, the single basic structural unit of the carbonized henequen, which is disorderedly arranged, becomes orderly arranged in proportion to an increase in the carbonization temperature, thus forming the graphite structure. As the temperature increases, the graphite structure is formed, and thus the henequen fibers carbonized at 1100° C. may exhibit superior stability in the high-temperature reaction compared to the supports treated at the lower temperature, that is, 700 or 900° C. Consequently, in the case where the Ni catalyst supported on the carbonized henequen obtained under such conditions is used for the high-temperature reforming reaction, deactivation over reaction time is remarkably lower compared to when using the conventional Ni/$Al_2O_3$ catalyst. The $CO_2$ conversion represented by a dashed line shows a similar tendency to the $CH_4$ conversion, and the $H_2$ yield represented by a dotted line is also similar thereto.

As mentioned above, this is because the alkaline earth metal particles such as Ca or Mg inherently contained in the henequen support impart a stronger catalyst-support interaction (SMSI), and thus the Ni catalyst particles do not agglomerate but are maintained in a state of being highly dispersed upon extended catalytic reaction.

Test Example 8

Comparison of Coke Formation after Catalytic Reforming Using Catalyst Comprising Henequen Support and Commercially Available Catalyst Using each of the catalysts of Example 1 and Comparative Example 1, the $CO_2$ reforming of $CH_4$ was performed, and the catalysts before and after the reforming reaction were recovered to perform elemental analysis (EA), and thus the amount of coke formed by the reforming reaction using each catalyst was estimated. The results are shown in Table 2 below.

TABLE 2

|  | C content (%) | |
| --- | --- | --- |
| C content (%) | Ni/Cellulose[a] | Ni/Al$_2$O$_3$ |
| before Reforming (pristine) | 80.3 | 79.8 |
| after Reforming | 80.6 | 87.3 |
| Amount of formed Coke | 0.3 | 7.5 |

[a]cellulose was carbonized at 1100° C. for 2 hr in the flow of H$_2$/N$_2$ (H$_2$:N$_2$ = 1:1 volume ratio)

In Table 2, the ratio of C contents measured before/after the reforming reaction was increased by 0.3% in the carbonized cellulose but was increased by 7.5% in the catalyst supported on commercially available $Al_2O_3$. The formation of coke in the cellulose support was remarkably decreased.

Consequently, the Ni catalyst supported on henequen can exhibit much more durability in the high-temperature catalytic reaction compared to the conventional Ni/Al$_2$O$_3$ catalyst. Most of the cellulose materials including henequen according to the present invention can be very effectively used as a catalytic support for a variety of reactions.

Test Example 9

ED-XRF Results for Analyzing Metal Content of Carbonized Henequen

Figure 7A:
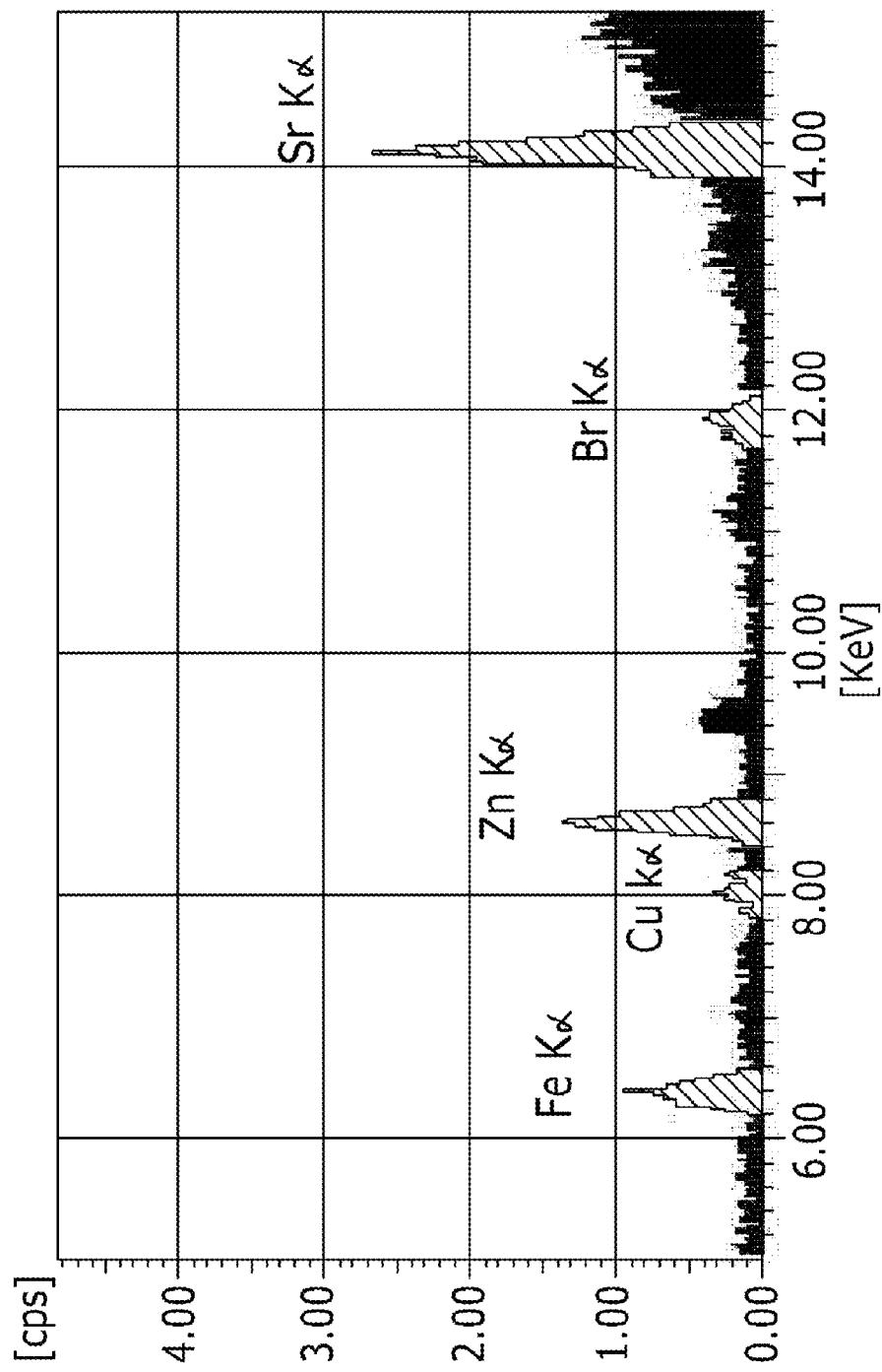
FIG. 7 shows ED-XRF results of henequen fibers carbonized at 700° C. according to an embodiment of the present invention.

FIG. 7 shows ED-XRF results of henequen fibers thermally treated at 700° C. As shown in FIG. 7, the henequen fibers thermally treated at 700° C. contain a variety of metal components, which are present in the sequence of Ca>Mg>Al>K>Cl, except for trace elements at less than 1%. In terms of the metal content obtained by TGA analysis being about 10~40%, the Ca content inherently contained in henequen is about 7.4~29.6%, which is evaluated to be very large.

Test Example 10

Analysis of Properties of Carbonized Kenaf and of Alkali Metal/Alkaline Earth Metal Components The BET surface area, SEM image and inherent metal components of the carbonized kenaf of Example 2 were analyzed using ED-XRF.

The BET surface area of kenaf fibers are shown in Table 3 below. As is apparent from Table 3, the surface area of the carbonized fibers is gradually increased in proportion to an increase in the thermal treatment temperature. This is because impurities (wax or pectin) are removed from the structure of cellulose fibers as mentioned above.

TABLE 3

| BET Surface Area and Porosity | | | |
| --- | --- | --- | --- |
| Thermal Treatment Temp. (° C.) | BET Surface Area (m$^2$/g) | Pore volume (cm$^3$/g) | Average Pore diameter (Å) |
| 500 | 156 | 0.10 | 24.8 |
| 700 | 290 | 0.14 | 19.7 |
| 900 | 422 | 0.38 | 27.1 |
| 1100 | 561 | 0.33 | 31.4 |

FIGS. 8A and 8B show the SEM images of kenaf fibers carbonized at 700° C. From this, many channels and pores are seen to be distributed inside and outside the carbonized fibers.

Figure 9A:
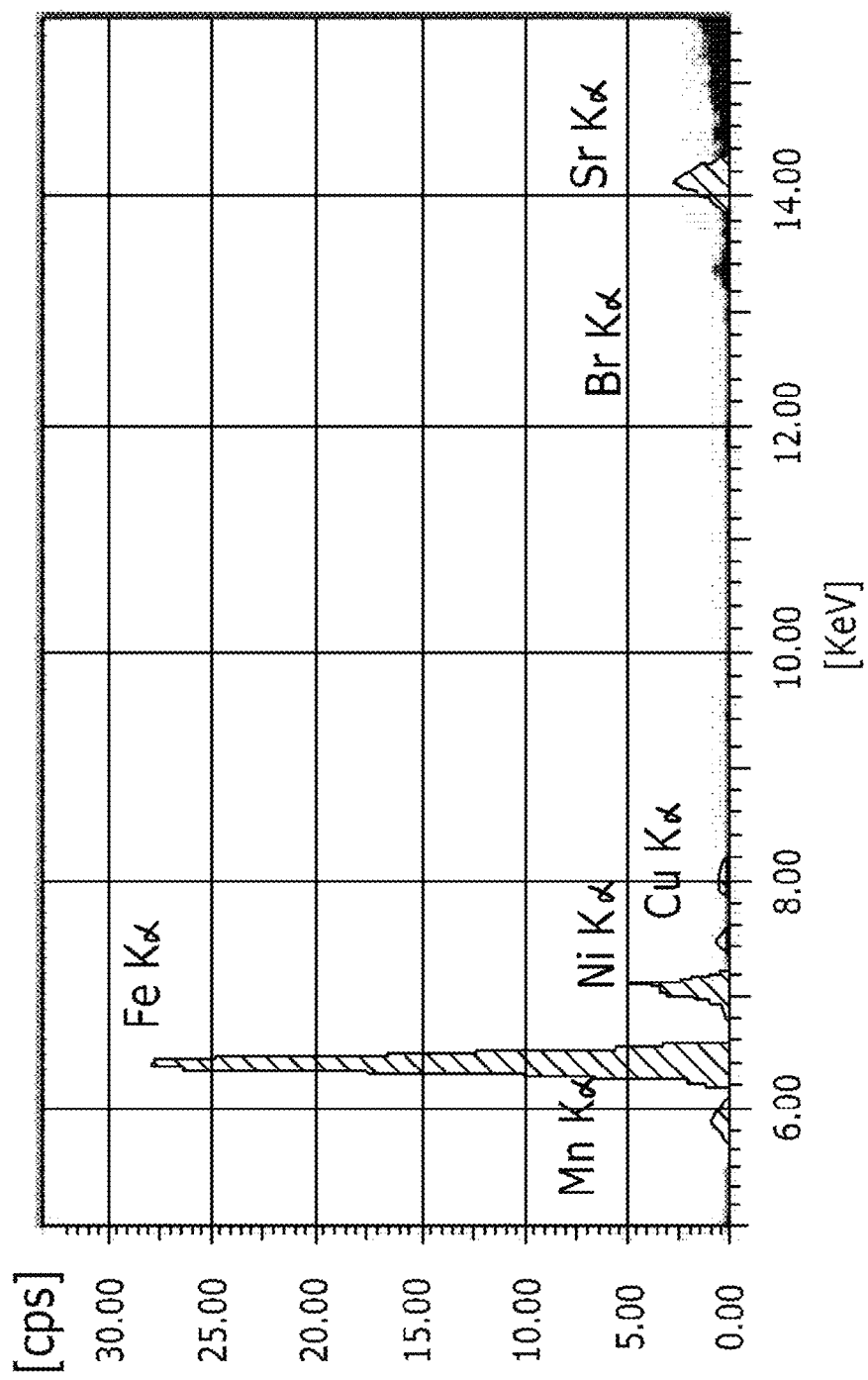
FIG. 9 shows ED-XRF results of kenaf fibers carbonized at 700° C. according to an embodiment of the present invention.

FIG. 9 shows the ED-XRF results of kenaf fibers thermally treated at 700° C. As shown in FIG. 9, the kenaf fibers thermally treated at 700° C. contain a variety of metal components, which are present in the sequence of Ca>Al>Fe>K>Ti, except for trace components at less than 1%. In terms of the metal content obtained by TGA analysis being about 10~40%, the Ca content inherently contained in kenaf is about 5~20%, which is regarded as very large. In addition, the alkali metal K is contained in a considerable amount.

Test Example 11

Analysis of Properties of Carbonized Rice Straw and of Alkali Metal/Alkaline Earth Metal Components The BET surface area, SEM image and inherent metal components of carbonized rice straw of Example 3 were analyzed using ED-XRF.

The BET surface area of the carbonized rice straw is shown in Table 4 below. As is apparent from Table 4, the surface area of the carbonized fibers is gradually increased in proportion to an increase the thermal treatment temperature. This is because impurities (wax or pectin) are removed from the structure of cellulose fibers as mentioned above. However, in the case of the rice straw treated at 1100° C., the surface area was decreased. This is considered to be due to the properties of rice straw wherein the rice straw easily structurally breaks upon treatment at a high temperature of at least 1100° C. and also part of the pores thereof may break, thus decreasing the surface area.

TABLE 4

| BET Surface Area and Porosity | | | |
| --- | --- | --- | --- |
| Thermal Treatment Temp. (° C.) | BET Surface Area (m$^2$/g) | Pore volume (cm$^3$/g) | Average Pore diameter (Å) |
| 500 | 128 | 0.08 | 25.0 |
| 700 | 358 | 0.16 | 27.0 |
| 900 | 485 | 0.28 | 22.9 |
| 1100 | 349 | 0.21 | 24.2 |

Figure 10A:
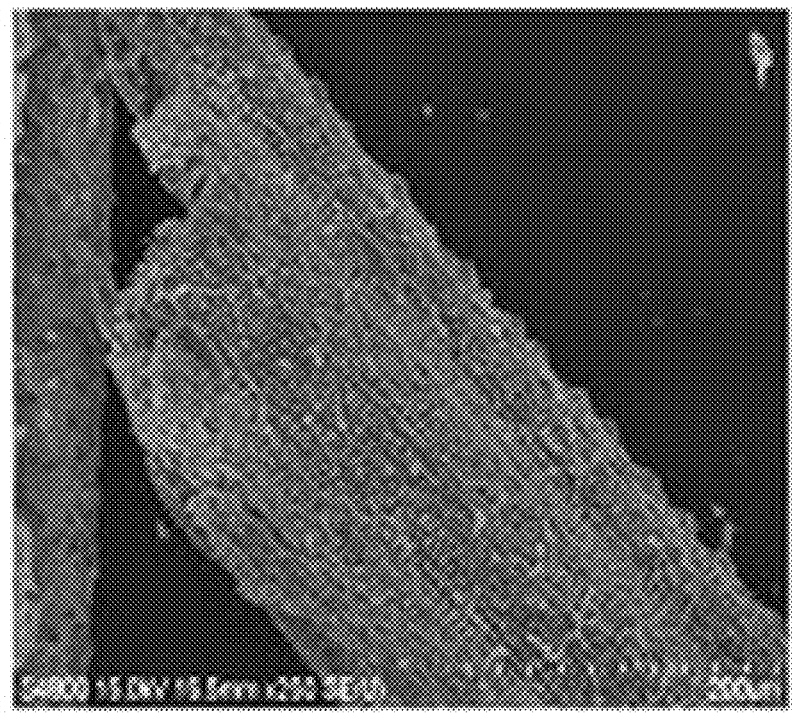
FIGS. 10A to 10D show SEM images of rice straw fibers carbonized at 700° C. according to an embodiment of the present invention.
Figure 10B:
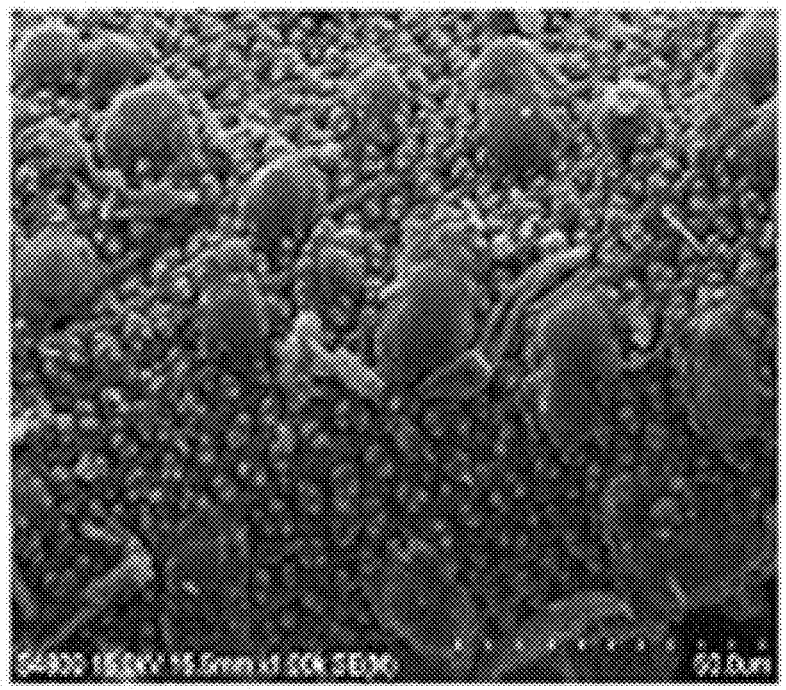
Figure 10C:
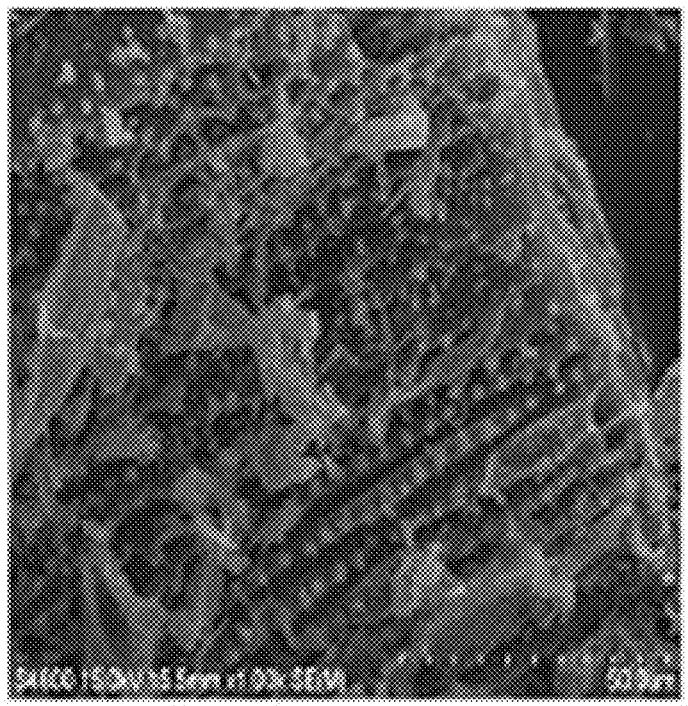
Figure 10D:
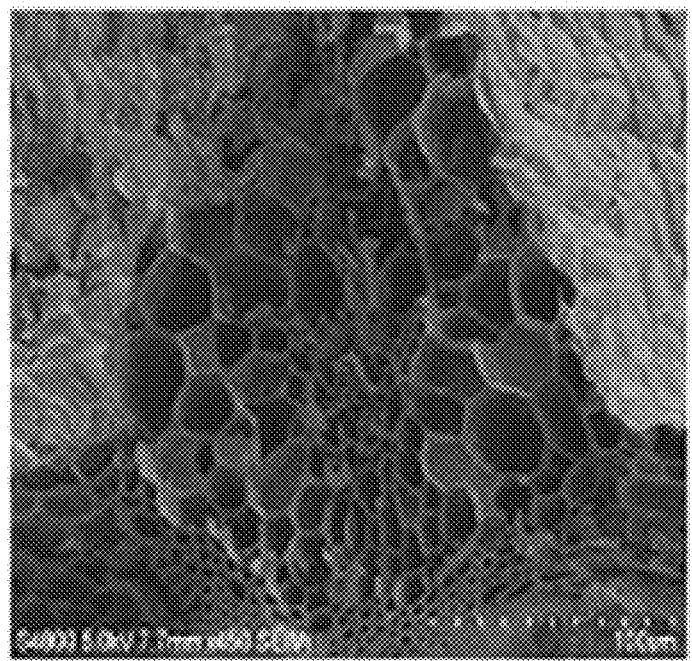

FIGS. 10A to 10D show the SEM images of rice straw fibers carbonized at 700° C., wherein many channels and pores are distributed inside and outside the carbonized fibers. FIG. 10A shows the outer surface of the fibers, FIG. 10B shows the enlarged image of the surface thereof, FIG. 10C shows the inner surface of the rice straw fibers cut in a perpendicular direction, and FIG. 10D shows the surface of the rice straw fibers cut in a transverse direction. From this, numerous channels are present in the rice straw fibers, resulting in a very superior surface area. Also, the surface roughness is very high, from which the surface area is estimated to be very superior, and a large number of particles are present inside/outside the fibers. The components of these particles were confirmed by ED-XRF. The results are shown in FIG. 11.

Figure 11A:
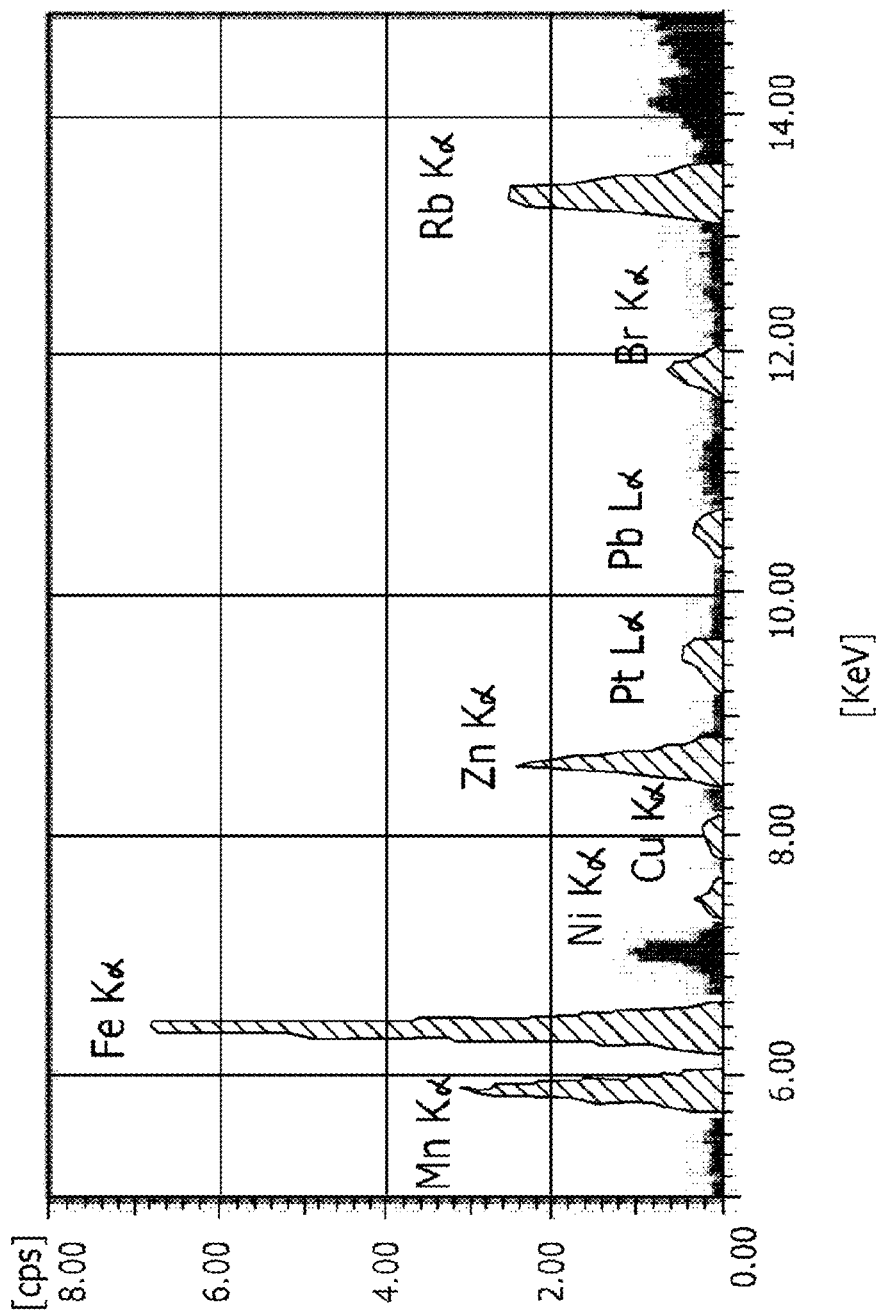
FIG. 11 shows ED-XRF results of rice straw components carbonized at 700° C. according to an embodiment of the present invention.

As shown in FIG. 11, the components of the particles on the surface of the fibers are very various and are seen to be present in the sequence of K>Si>Ca>Fe>P>Cl>Mn except for trace components at less than 1%. In terms of the metal content obtained by TGA analysis being about 30~40%, the K content inherently contained the rice straw fibers is about 15~20%, which is evaluated to be very large. Thanks to so high a metal content, the rice straw (cellulose) is very appropriate for use as a catalytic support. Because the metal components are inherently contained in a state of being highly dispersed in the cellulose fibers of the rice straw, they act very favorably upon the catalytic reaction. Also, as shown in FIG. 11, the amount of the alkaline earth metal Ca was very large in addition to the alkali metal K. Accordingly in the case where the cellulose support of the present invention is used for the high-temperature catalytic reaction such as the reforming reaction, intrinsic properties of the alkali metal/alkaline earth metal, for example, an increase in the dispersibility of a catalytic metal, a decrease in the coke formation, an improvement in the durability of the catalyst, etc., may be advantageously exhibited.

Figure 12:
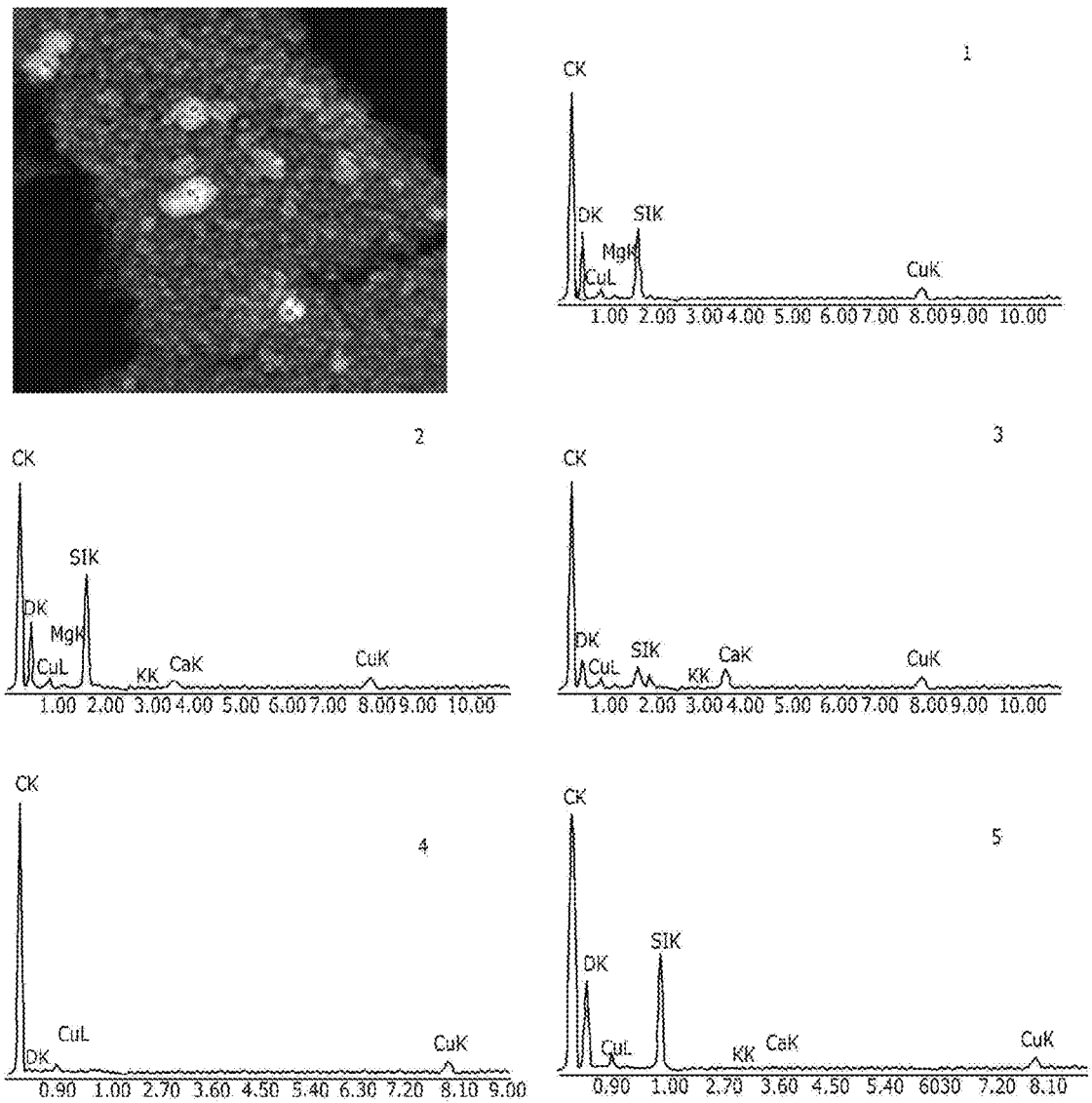
FIG. 12 shows a TEM image of rice straw carbonized at 700° C. according to an embodiment of the present invention, and EDAX analysis results of portions represented by white particles in the TEM image.

FIG. 12 shows the TEM results of the rice straw carbonized at 700° C., wherein the EDAX analysis results of portions represented by white particles in the TEM image are also seen. As shown in FIG. 12, the main components of white particles are determined to be Si or Ca via EDAX analysis. These results coincide with the ED-XRF results of FIGS. 10A to 10D.

Figure 13:
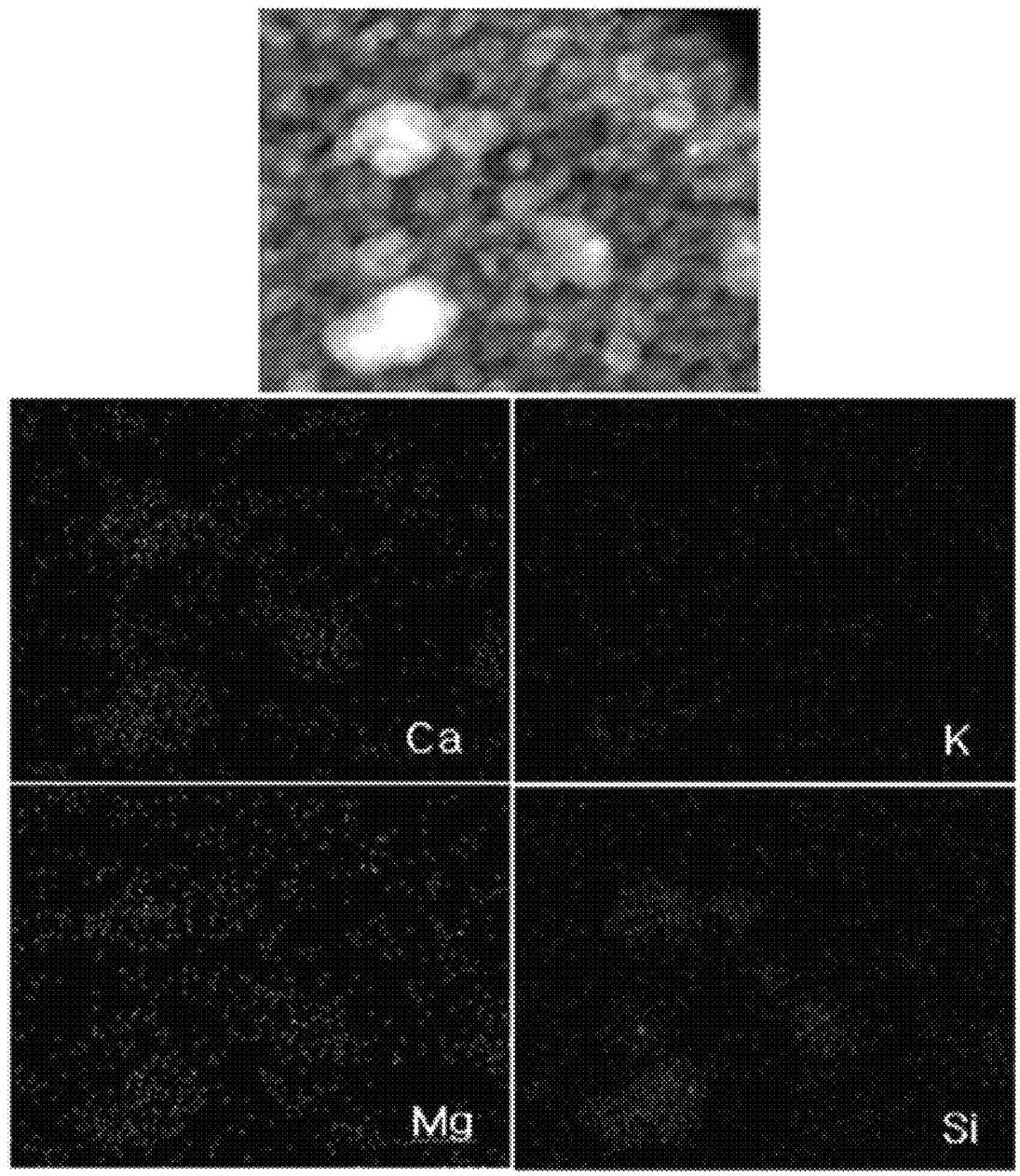
FIG. 13 is of STEM images showing the mapping results of rice straw carbonized at 700° C. according to an embodiment of the present invention.

FIG. 13 is of STEM images showing the mapping results of the rice straw carbonized at 700° C., in order to check the actual distribution form of the metal components confirmed by ED-XRF and TEM-EDAX in the sample. As shown in FIG. 13, the metal components such as Ca, Si, Mg, and K can be seen to be mainly present in the portions represented by white particles in the STEM images.

As described hereinbefore, the present invention provides a method of preparing a catalyst using an alkali metal or an alkaline earth metal in natural cellulose fibers as a co-catalyst and a dispersant. According to the present invention, the catalyst can be prepared using alkali metal and/or alkaline earth metal components as a co-catalyst and a dispersant, thus increasing the dispersibility of catalytic components and enhancing the interaction between the catalyst and the support to thereby retard agglomeration and increase the durability of the catalyst.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a catalyst using an alkali metal or an alkaline earth metal inherently contained within natural cellulose fibers, and without the artificial addition of the alkali metal or the alkaline earth metal, such that the alkali metal or alkaline earth metal inherently contained within the natural cellulose fibers is a co-catalyst and a dispersant, the method of preparing the catalyst comprising:

thermally treating natural cellulose fibers to remove impurities from the natural cellulose fibers and to disperse the inherently contained alkali metal or the inherently contained alkaline earth metal in a form of nanoparticles dispersed within the fibers and on a surface of the fibers wherein the alkali metal is selected from the group consisting essentially of Li, Na and K, and the alkaline earth metal is Ca or Mg;

chemically treating the thermally treated natural cellulose fibers with an acidic solution to introduce a functional group onto the surface of the natural cellulose fibers, thus preparing a cellulose support; and supporting metal catalyst nanoparticles on the surface of the chemically treated cellulose support using chemical vapor deposition or impregnation, wherein the thermal treatment of the natural cellulose fibers is performed by subjecting the natural cellulose fibers to cutting to a length of 1~2 mm in liquid nitrogen, heating to 500~1800° C. at a heating rate of 5~20° C./min in an atmosphere of H2 and N2 at 1:1, and then maintaining at 500~1800° C. for 0.5~2 hr, wherein the chemically treating the natural cellulose fibers with the acidic solution is performed by immersing the natural cellulose fibers in a 0.1~0.5 mol sulfuric acid aqueous solution, performing 10~60 treatments at a sweep rate of 50 mV/s at −0.15~1.3 V, immersing the natural cellulose fibers in a 30% nitric acid solution (or a 14 N nitric acid solution) at 100~150° C. and chemically treating them for 10 min~20 hr, and wherein the natural cellulose fibers are selected from the group consisting of rice straw, barley straw, wheat straw, rice husk and mixtures thereof.

2. The method of claim 1, wherein the thermal treatment is performed at 700~1100° C.

3. The method of claim 1, further comprising washing and drying the natural cellulose fibers after chemical treatment with the acidic solution, to prepare the cellulose support.

4. The method of claim 1, wherein the functional group introduced onto the surface of the natural cellulose fibers after chemical treatment with the acidic solution is CO—, CH—, O—C=O, $CO_2$ or $CO_3$.

5. The method of claim 1, wherein the metal catalyst nanoparticles supported on the surface of the cellulose support are Pt particles, and a Pt precursor for supporting the Pt particles on the surface of the cellulose support is selected from the group consisting of methyltrimethylcyclopentadiethyl platinum ($MeCpPtMe_3$), $Pt(Me)_3(Cp)$, $Pt(Tfacac)_2$, $Pt(Me)(CO)(Cp)$, $Pt(Me)_2(COD)$, $[PtMe_3(acac)]_2$ (acac; acetylacetonato ligand), $PtCl_2(CO)_2$, $Pt(PF_3)_4$, $Pt(acac)_2$ and $Pt(C_2H_4)_3$.

6. The method of claim 1, wherein the metal catalyst nanoparticles supported on the surface of the cellulose support are Ni particles, and a Ni precursor for supporting the Ni particles on the surface of the cellulose support is nickel nitrate ($Ni(NO_3)_2$) or nickel carbonyl ($Ni(CO)_4$).

7. The method of claim 1, wherein the metal catalyst nanoparticles supported on the surface of the cellulose support are Co particles, and a Co precursor for supporting the Co particles on the surface of the cellulose support is $Co(CO)_3NO$ or $Co(NO_3)_2$.

8. The method of claim 1, wherein the metal catalyst nanoparticles supported on the surface of the cellulose support are Mo particles, and a Mo precursor for supporting the Mo particles on the surface of the cellulose support is $Mo(CO)_6$.

* * * * *